(12) United States Patent
Endo et al.

(10) Patent No.: US 7,605,978 B2
(45) Date of Patent: Oct. 20, 2009

(54) TRANSPARENT SCREEN AND PROJECTION DISPLAY UNIT

(75) Inventors: Takao Endo, Tokyo (JP); Akihisa Miyata, Tokyo (JP); Takeshi Utakoji, Tokyo (JP); Yuzo Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 377 days.

(21) Appl. No.: 11/600,174

(22) Filed: Nov. 16, 2006

(65) Prior Publication Data

US 2007/0279736 A1    Dec. 6, 2007

(30) Foreign Application Priority Data

Jun. 5, 2006    (JP)    .............. 2006-156280

(51) Int. Cl.
*G03B 21/60*    (2006.01)
*G03B 21/56*    (2006.01)

(52) U.S. Cl. ...................... 359/453; 359/460

(58) Field of Classification Search ............. 359/457, 359/460, 455–456, 452–453
See application file for complete search history.

(56) References Cited

U.S. PATENT DOCUMENTS 6,147,801 A * 11/2000 Goldenberg et al. ........ 359/456
6,327,083 B1   12/2001 Goldenberg et al.

FOREIGN PATENT DOCUMENTS

JP    10-501636 A    2/1998
JP    3698159 B2     7/2005

* cited by examiner

*Primary Examiner*—Christopher Mahoney
(74) *Attorney, Agent, or Firm*—Birch, Stewart, Kolasch & Birch, LLP

(57) ABSTRACT

A transparent screen and a projection display unit capable of reducing the speckle with maintaining the brightness of the image light. A wavefront-dividing phase-modulating component 21, which divides the wavefront of the image light emitted from a Fresnel lens screen 7 and modulates the phases of the wavefronts divided, is disposed before an optical diffusing component 10. Alternatively, a spatial frequency modulating component 22, which modulates the spatial frequency of the image light diffused by the optical diffusing component 10, is disposed on the light-output side (observer side) of the optical diffusing component 10.

17 Claims, 19 Drawing Sheets

TRANSPARENT SCREEN AND PROJECTION DISPLAY UNIT

BACKGROUND OF THE INVENTION

1. Field of the Invention

The present invention relates to a transparent screen including a combination of a Fresnel optical component for bending image light radiated from a projector toward an observer and an optical diffusing component for scattering the image light, and to a projection display unit installing the transparent screen.

2. Description of Related Art

Unlike a CRT (Cathode Ray Tube) or PDP (Plasma Display Panel), a projection display unit is a non-light emitting type display unit.

As shown in FIG. 25, a conventional projection display unit has a projector 1 including an illuminating optical system 2 for illuminating a light valve 3, the light valve 3 for generating image light with adjusting a quantity of light in response to an image signal, and a projection optical system 4 for projecting an image onto a transparent screen 6 by radiating the image light generated by the light valve 3.

The projection display unit is classified into rear projection that projects the image light onto the transparent screen 6 from its back with respect to an observer, and front projection that projects the image light onto the transparent screen 6 from this side of the observer.

As shown in FIG. 25, the transparent screen 6 used for the rear-projection display unit includes a Fresnel lens screen 7 which is a Fresnel optical component for bending the image light radiated from the projector 1 toward the observer side, and an optical diffusing component 10 for providing a diverging angle to the image light to spread it.

A Fresnel lens 9 constituting the Fresnel lens screen 7 is usually fabricated in such a manner as to have a period smaller than a projection pixel (such as 1/10 of the pixel). Thus, the Fresnel lens 9 becomes very thin (such as 100 microns in thickness including its prism section).

To support the very thin Fresnel lens 9, the Fresnel lens screen 7 has a Fresnel lens substrate 8.

The Fresnel lens substrate 8 is usually made of glass or a resin such as PMMA, MS and PC, and the Fresnel lens 9 is usually formed on the Fresnel lens substrate 8 directly.

Although FIG. 25 shows an example of a light-output side Fresnel lens having the Fresnel lens 9 formed on the light-output side of the Fresnel lens screen 7, this is not essential. For example, as shown in FIG. 26, a light-input side Fresnel lens is also possible which has the Fresnel lens 9 formed on the light-input side of the Fresnel lens screen 7.

The optical diffusing component 10, which includes at least a lens element 11 and an optical diffusion sheet 12, is generally referred to as a lenticular screen.

Although the example of FIG. 25 includes a reflecting mirror 5, an example without the reflecting mirror 5 as shown in FIG. 26 is also possible.

When observing the image light radiated from the projector 1 through the transparent screen 6, an observer will recognize innumerable light and dark spots (glare) at random. This is because the unevenness on the surface of the optical diffusing component 10 and its internal refractive index distribution, phase distribution and transmittance distribution have fluctuations greater than the wavelength of the image light.

The light and dark spots, which are generally referred to as speckle or scintillation, present a problem of image degradation.

The following Patent Document 1 discloses an example that disposes a speckle reduction micro-lenticular lens on a light source side of the Fresnel lens screen 7 to reduce the speckle.

By disposing the speckle reduction micro-lenticular lens, the image light radiated from the projector 1 is provided with a diverging angle $\theta$ v. During the propagation over the distance between the Fresnel lens screen 7 and the lens element 11, the image light provided with the diverging angle $\theta$ v spreads in proportion to the propagation distance t0, and illuminates the optical diffusion sheet 12 which is closer to the light source than a black stripe layer is.

In this way, the image light radiated from the projector 1 is spread through the speckle reduction micro-lenticular lens during the propagation over the distance between the Fresnel lens screen 7 and the lens element 11. When the propagation distance t0 is short, the diverging angle $\theta$ v the speckle reduction micro-lenticular lens provides must be increased.

When the Fresnel lens 9 is formed on the light-input side of the Fresnel lens screen 7 as shown in FIG. 26, the speckle reduction micro-lenticular lens cannot be disposed on the light-input side of the Fresnel lens screen 7. Accordingly, the speckle reduction micro-lenticular lens must be disposed on the light-output side of the Fresnel lens screen 7.

The thickness of the lens element 11 is several hundred microns at most, and the greater part of the propagation distance t0 consists of the thickness of the Fresnel lens substrate 8 of the Fresnel lens screen 7. Thus, if the propagation distance t0 is reduced by a factor of 10 from 3 millimeters to 300 microns, 10 times the diverging angle $\theta$ v is required.

Although the image light radiated from the projector 1 spreads in proportion to the diverging angle $\theta$ v, the energy of the entire image light is conserved according to the energy conservation law, which presents a problem of dimming the image light by an amount of spreading.

It is generally preferable for the screen of the projector to be "bright and wide in the viewing angle". However, since there is a tradeoff between them according to the energy conservation law, the image light cannot be spread irrespective of the relationship.

As described above, the point of origin of the speckle phenomenon is the unevenness on the surface of the optical diffusing component 10 or the fluctuations of its internal refractive index distribution, phase distribution and transmittance distribution. Thus, the image light transmitted through the fluctuation structure, that is, the wavefront of the image light, is disturbed through the fluctuation structure, as a result of which the light and dark spots are formed.

The characteristic length of the fluctuation structure (the period of fluctuations when fluctuating regularly, for example) becomes a problem.

Patent Document 1: Japanese patent application laid-open No. 2004-171011 (Paragraph No. [0040] to [0051] and FIG. 11)

SUMMARY OF THE INVENTION

With the foregoing configuration, the conventional projection display unit can reduce the speckle by disposing the speckle reduction micro-lenticular lens and by providing the diverging angle $\theta$ v to the image light radiated from the projector 1. However, providing the image light with the large diverging angle $\theta$ v offers a problem of dimming the image light.

The present invention is implemented to solve the foregoing problem. It is therefore an object of the present invention to provide a transparent screen and projection display unit capable of reducing the speckle with maintaining the brightness of the image light.

The transparent screen in accordance with the present invention is constructed in such a manner that it disposes before an optical diffusing component a wavefront-dividing phase-modulating component for dividing the wavefront of the image light emitted from a Fresnel optical component and for modulating the phase of the wavefront.

According to the present invention, the foregoing configuration offers an advantage of being able to reduce the speckle with maintaining the brightness of the image light.

BRIEF DESCRIPTION OF THE DRAWINGS

FIG. 16 is a diagram illustrating a path of a ray bundle when the spatial frequency modulating component 22 consists of sawlike prisms 22a;

FIG. 17 is a diagram illustrating a path of a ray bundle when a spatial frequency modulating component 22 consists of sawlike prisms 22a;

DETAILED DESCRIPTION OF THE PREFERRED EMBODIMENTS

The invention will now be described with reference to the accompanying drawings.

Embodiment 1

Figure 1:
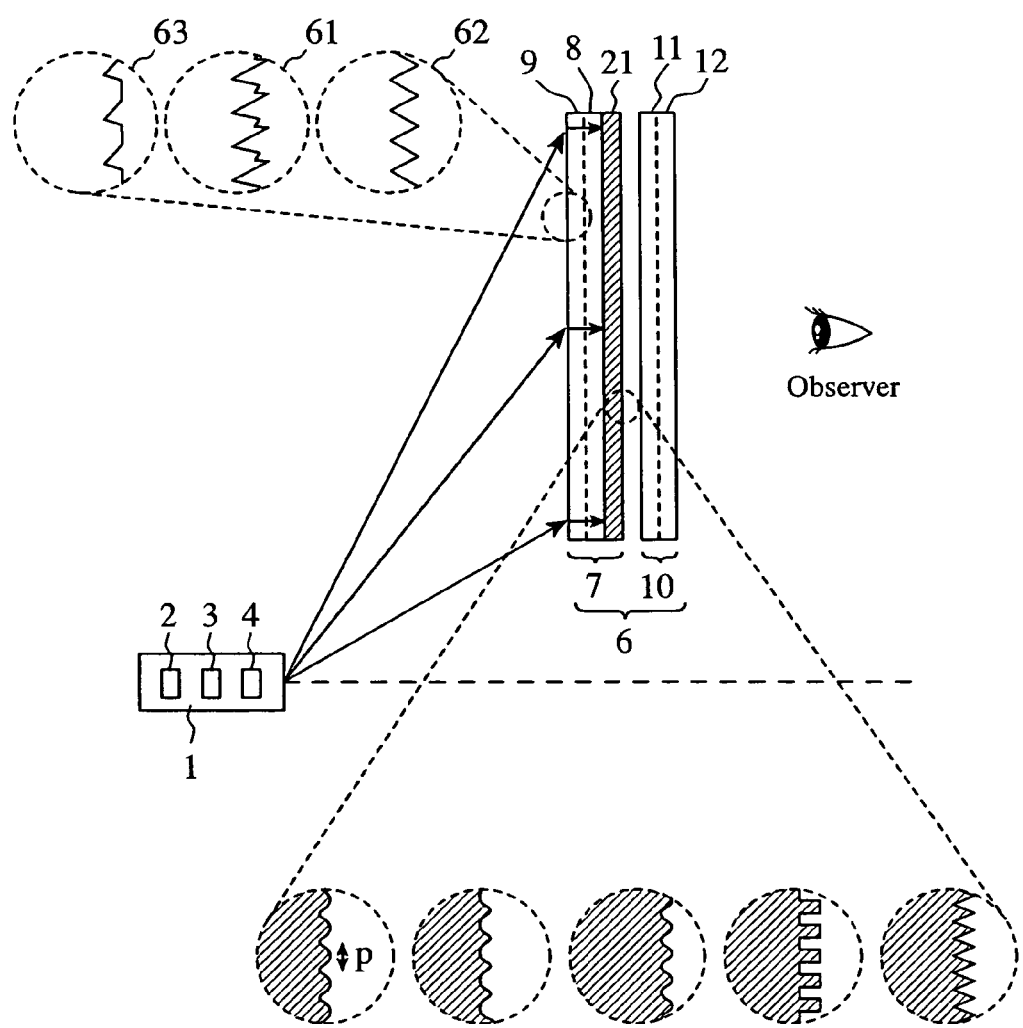
FIG. 1 is a diagram showing a configuration of a projection display unit of an embodiment 1 in accordance with the present invention.

FIG. 1 is a diagram showing a configuration of a projection display unit of an embodiment 1 in accordance with the present invention. In FIG. 1, a projector 1, which is a light-emitting component for radiating the image light, includes a light valve 3 for generating the image light by adjusting the quantity of light in response to an image signal; an illuminating optical system 2 for illuminating the light valve 3; and a projection optical system 4 for projecting an image onto a transparent screen 6 by radiating the image light generated by the light valve 3.

The transparent screen 6 comprises a Fresnel lens screen 7 and an optical diffusing component 10.

The Fresnel lens screen 7 of the transparent screen 6 is a Fresnel optical component for receiving the image light radiated from the projector 1, and emits the image light in a prescribed direction.

The Fresnel lens screen 7 comprises a Fresnel lens substrate 8 and a Fresnel lens 9 which is a very thin and supported by the Fresnel lens substrate 8.

A wavefront-dividing phase-modulating component 21 is a component that divides the wavefront of the image light emitted from the Fresnel lens screen 7 into fine pieces spatially, and modulates the phases of the wavefronts divided (a component that provides the wavefronts with a inclination or an optical path length difference). A surface of the wavefront-dividing phase-modulating component 21 can be a curved surface shaped like a convex lens array, concave lens array or sinusoidal wave, or a plane shaped like a lattice or saw.

The optical diffusing component 10 is a component that spreads the image light, the phases of the wavefronts of which are modulated by the wavefront-dividing phase-modulating component 21. The optical diffusing component 10 comprises at least a lens element 11 and an optical diffusion sheet 12, and is generally called a lenticular screen.

Next, the operation will be described.

First, the cause of the phenomenon called speckle or scintillation appearing on the transparent screen 6 will be described.

When a surface of an object has rough unevenness with respect to the order of the wavelength of light, an image of the coherent illuminating light appears which is scattered by, transmitted through or reflected from the surface of the object.

It results from superposition of many amplitude distributions (not intensity distributions) point of originating from different scattering points, and is explainable from interference due to coherence the light source has.

Here, for the sake of simplicity, consider a superposition of monochromatic waves $E_{jk}$ given by the following expression (1).

$$E_j(r,t)=Re[E_{jk} \exp i (kr-\omega t+\delta_{jk})] \quad (1)$$

where k is the wave number, r denotes the position, $\omega$ is the angular frequency, t is the time, and $\delta$ is the phase.

For example, in the case where two monochromatic waves overlap each other at a certain point as shown by the following expression (2), the time average $<E^2>$ of the intensity of the monochromatic wave is given by the following expression (3).

$$E=E_1+E_2 \quad (2)$$

$$<E^2>=<E_1^2>+<E_2^2>+2<E_1E_2> \quad (3)$$

The time average $<E^2>$ of the intensity of the monochromatic wave includes an additional interference term as shown in the following expression (4), that is, $2<E_1E_2>$. Accordingly, the intensity varies according to such factors as polarization and phase difference between the two monochromatic waves.

$$2<E_1E_2>=\Sigma E_{1k}E_{2k}\cos(\delta_{2k}-\delta_{1k}) \quad (4)$$

where $\Sigma$ is a summation mark indicating addition for k=1–3.

On the other hand, the speckle is sometimes observed when the light from faraway celestial bodies is observed on the earth, for example.

Considering the difference between the light from the celestial bodies and the laser light source: the spectrum of the light from the celestial bodies is continuous and incoherent; but the spectrum of the laser light source is monochromatic and coherent.

Figure 2:
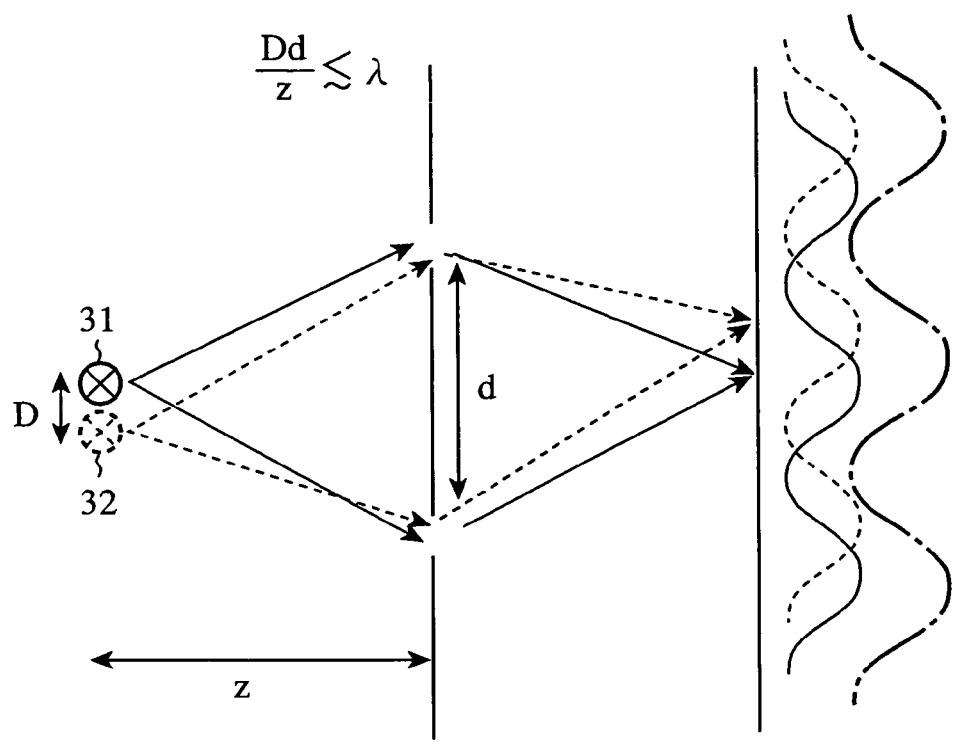
FIG. 2 is a diagram illustrating overlap results of interference fringes.

Consider an example as shown in FIG. 2 including slits with the spacing d and an incoherent monochromatic light source with a limited size D. Assume that the upper end of the monochromatic light source is a first light source 31 virtually, and the lower end of the monochromatic light source is a second light source 32 virtually. Then, consider the case where the first light source 31 and second light source 32 emit light.

The light from the first light source 31 forms interference fringes indicated by a solid curved line because the light passes through different optical paths. Likewise, the light from the second light source 32 forms interference fringes indicated by a broken curved line.

The difference between the points of origin of the interference fringes reduces with the reduction in the difference D between the positions of the monochromatic light sources.

Since there is no correlation between the first light source 31 and second light source 32, the superposition of the interference fringes indicated by the solid curved line and the interference fringes indicated by the broken curved line becomes simply the superposition of the intensity rather than that of the amplitude.

When the slit spacing d is small, the period of the interference fringes increases inversely. Accordingly, the difference between the points of origin of the interference fringes is smaller than the period. Thus, as a result of the addition of the intensities, the fringes are enhanced as indicated by the dashed-and-dotted curved line.

In contrast, when the slit spacing d is large, the period of the interference fringes decreases inversely. Accordingly, the difference between the points of origin of the interference fringes is greater than the period. Thus, as a result of the addition of the intensities, peaks and valleys of the fringes cancel each other out so that the fringes are diminished.

The wavefront from the monochromatic light source with the limited size D has a inclination of D/z, and has coherence if the optical path length difference is equal to or less than $\lambda$ at a position separated by the slit spacing d.

$$Dd/z \leq \lambda \quad (5)$$

In addition, the length d for maintaining the coherence is given by the following expression (6).

$$d \leq \lambda z/D \sim \lambda F \quad (6)$$

where F is the F-number, which represents the reciprocal of the spread of the ray bundle, that is, F~z/D. Accordingly, the length d for maintaining the coherence increases with a reduction of the spread of the ray bundle (with an increase in the F-number)

Here, an optical invariant will be described.

Figure 3:
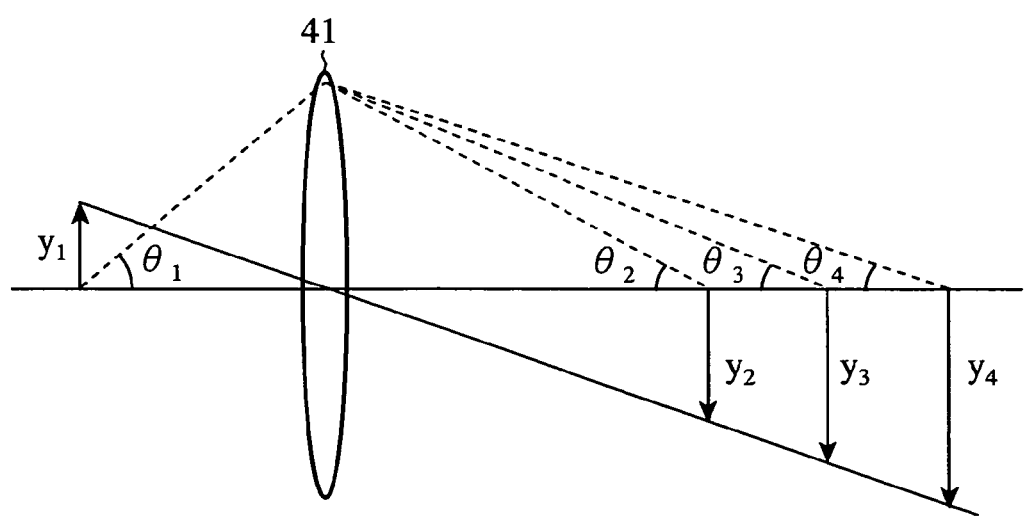
FIG. 3 is a diagram illustrating an optical invariant.

FIG. 3 is a diagram illustrating the optical invariant.

FIG. 3 illustrates an example in which an object of a size $y_1$ forms an image of a size $y_2$ through a lens 41.

In this case, although proof is omitted here, the relationship between the image size and a diverging angle $\theta$ is given by the following expression (7).

$$y_1\theta_1=y_2\theta_2 \quad (7)$$

The relational expression, which indicates that the product of the size of the image and the diverging angle $\theta$ is invariant in the optical system, is referred to as "Helmholtz-Lagrange invariant" and holds in the paraxial theory strictly.

For example, if the size of the image varies in such a manner as $y_2<y_3<y_4$, then the diverging angle $\theta$ varies such as $\theta_2>\theta_3>\theta_4$, respectively.

It is thus found that the spread of the ray bundle varies inversely with the lateral magnification $\beta$ of the optical system.

$$\beta=y_2/y_1 \quad (8)$$

Since the magnification of the projector optical-system is usually as high as 50-100, the spread of the ray bundle reduces inversely to the magnification.

Next, the relationships between the optical system of the rear projection display unit and the screen will be described.

Figure 4:
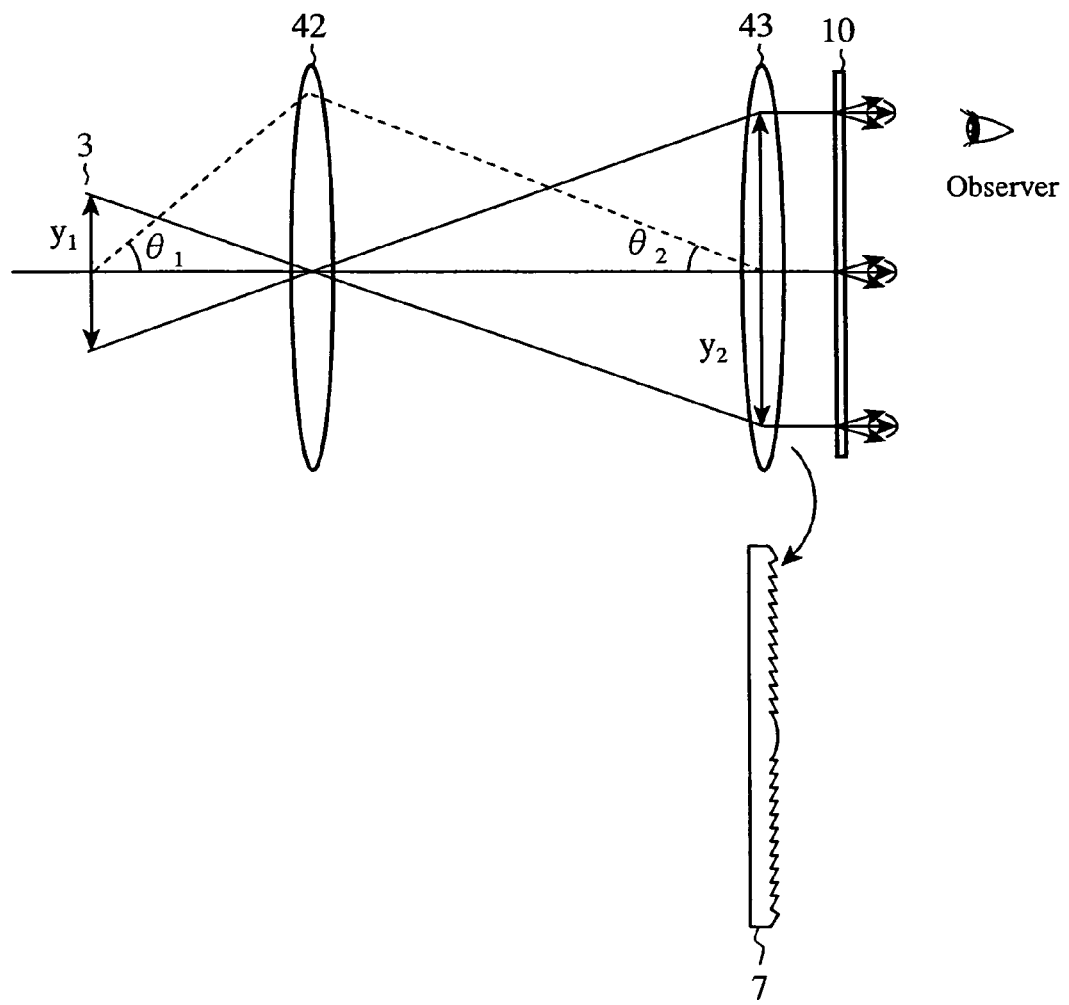
FIG. 4 is a diagram illustrating relationships between a schematic depiction of an optical system and a screen.

FIG. 4 is a diagram illustrating relationships between the schematic depiction of the optical system and the screen.

In FIG. 4, the illuminating light from an illuminating optical system (not shown) forms an image at the light valve 3 of the projector 1. The image is projected to the optical diffusing component 10 by a virtual projection lens 42, which is the projection optical system 4, through a virtual condenser lens 43.

When the screen of the rear projection display unit is large in size (such as one square meter), the Fresnel lens screen 7, one of the Fresnel optical components, is employed as the virtual condenser lens 43.

Since the image is magnified according to the lateral magnification $\beta=y_2/y_1$ of the projection optical system, the spread of the ray bundle (diverging angle $\theta_2$) becomes $1/\beta$, and the length d for maintaining the coherence is given by the following expression (9).

$$d \leq \lambda F \beta \quad (9)$$

For example, assume that the magnification of the projection optical system $\beta=100$, the F-number of the illuminating optical system F=3.5, and the wavelength $\lambda=530$ nm, then the length d for maintaining the coherence is given by d<186 microns.

Since the distance d is directly proportional to the magnification β or F-number, the greater the F-number and lateral magnification β (the narrower the spread of the ray bundle), the greater the distance d.

As the optical diffusing component 10, a surface diffusion type, volume diffusion type and the like can be employed, for example. The surface diffusion type spreads the image light through the unevenness on the surface. On the other hand, the volume diffusion type includes beads of a variety of grain sizes, which have a refractive index different from that of a medium, and the beads spread the image light.

The characteristic length of the unevenness on the surface or of the beads is greater than the wavelength of visible light (of about 380-780 nm), and is 1-50 microns at most, and the mainstream is about 5-20 microns in practice.

When the characteristic length of the fluctuations in the surface of the illuminated plane (irradiated surface) is sufficiently smaller than the length d for maintaining the coherence, the image light becomes partially coherent illuminating light because of spatial coherence, thereby causing light and dark spots, that is, speckle noise.

Although the proof is omitted, since the foregoing discussion about the monochromatic light applies to the superposition of the intensity rather than the amplitude, it is also applicable to a light source with a bandwidth such as quasi-monochromatic light.

From the above, even the incoherent light source becomes partially coherent illumination because of the spatial coherence of the light source with the limited size, and hence the speckle phenomenon can be explained on the basis of the superposition of the intensity rather than the amplitude.

As for the laser light source, since it is a quasi-monochromatic light source with a narrow bandwidth, the speckle is observed as discussed above even if the high coherence of the laser light source is reduced by some means.

To reduce the light and dark spots, or the speckle noise, it is clear from the foregoing discussion that the image light incident on the optical diffusing component 10 should be spread. In other words, the wavefront incident on the optical diffusing component 10 should be provided a variety of inclinations.

Figure 5:
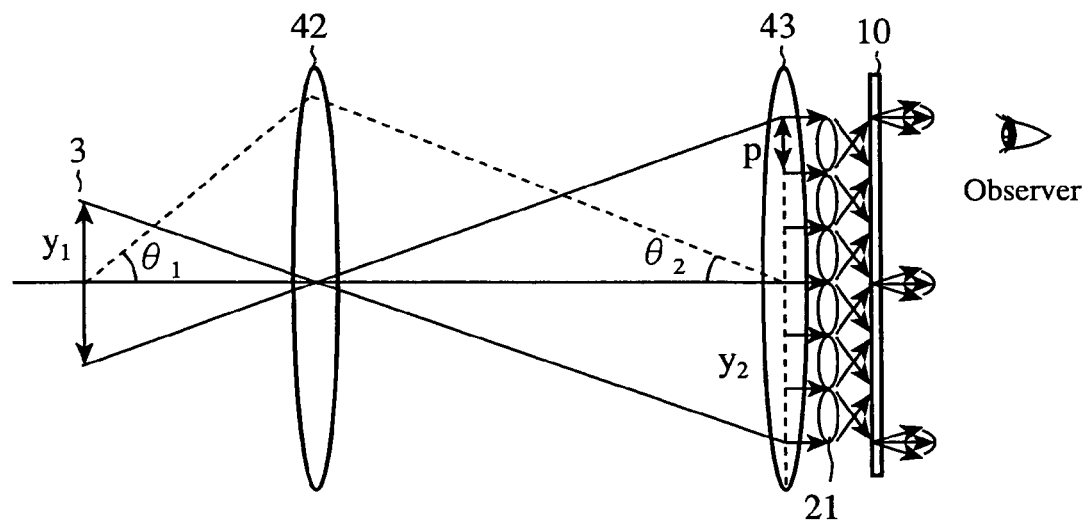
FIG. 5 is a diagram illustrating relationships between a schematic depiction of an optical system and a screen.

FIG. 5 is a diagram illustrating relationships between the schematic depiction of the optical system and the screen.

In FIG. 5, a wavefront-dividing phase-modulating component 21 is interposed between the virtual condenser lens 43 which is equivalent to the Fresnel optical component and the optical diffusing component 10.

In FIG. 5, although the wavefront-dividing phase-modulating component 21 is represented by small lenses for the sake of simplicity, this is not essential. For example, it can be a curved surface shaped like a convex lens array, concave lens array or sinusoidal wave, or a plane shaped like a lattice or saw.

This is because it aims at dividing the wavefront into fine pieces spatially before the optical diffusing component 10, and at providing the wavefront with a inclination or optical path length difference.

In addition, although the wavefront-dividing phase-modulating component 21 of FIG. 5 is shown by way of example configured by disposing lenses, whose vertical section has the shape of the wavefront-dividing phase-modulating component 21 and which extend in the horizontal direction (when the section consists of circular arcs, they are cylindrical lenses), this is not essential. For example, it is also possible to dispose, in the horizontal direction, lenses whose horizontal section has the shape of the wavefront-dividing phase-modulating component 21 and which extend in the vertical direction; or to stack the two types of the lenses in two layers; or to dispose a two-dimensional micro-lens whose horizontal and vertical sections have the shape of the wavefront-dividing phase-modulating component 21.

What is important here is that the unit length of the wavefront-dividing phase-modulating component 21 must be smaller than the projection pixels, and from the foregoing discussion, it is preferably equal to or less than the characteristic length of the fluctuation structure if possible.

Figure 6:
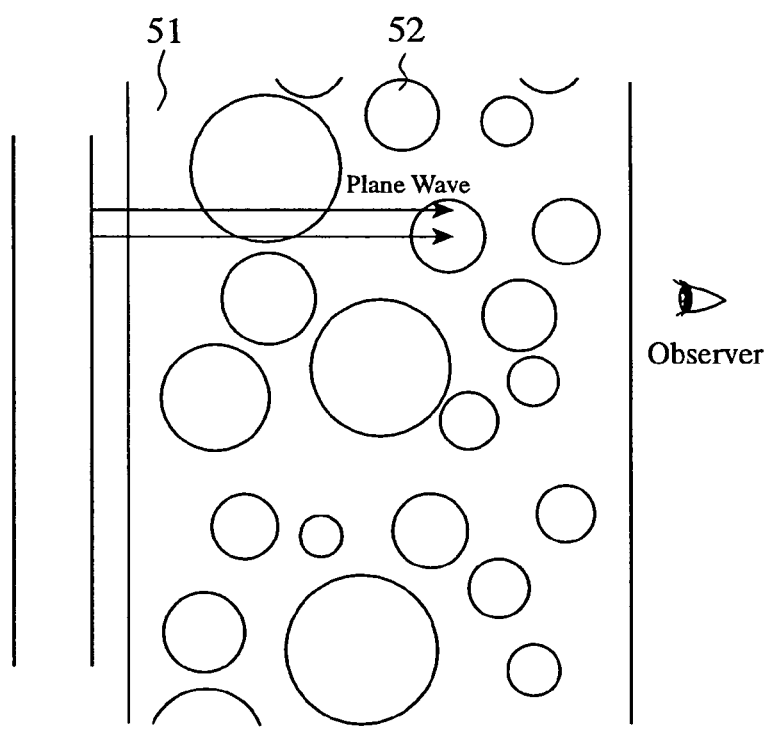
FIG. 6 is a diagram illustrating an interior of an optical diffusion sheet 12.
Figure 7:
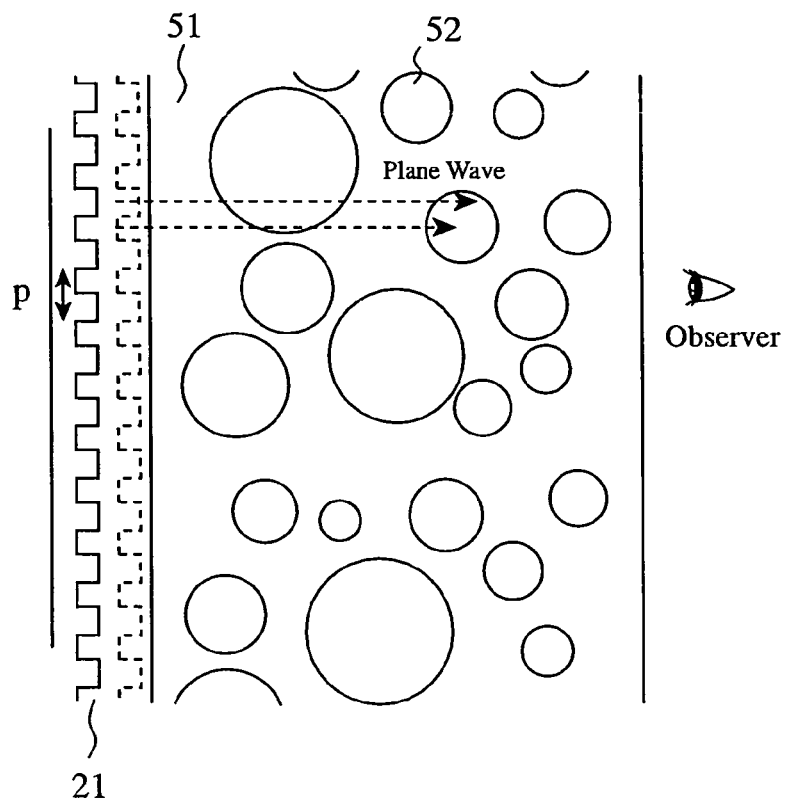
FIG. 7 is a diagram illustrating an interior of the optical diffusion sheet 12.

FIG. 6 and FIG. 7 are diagrams each illustrating the interior of the optical diffusion sheet 12.

FIG. 6 shows an example of the optical diffusion sheet 12 in which optical diffusion beads 52, which differ in the refractive index and have a variety of particle diameters, are put into an optical diffusion sheet medium 51.

Here, for the sake of simplicity of explanation, consider a case in which a plane wave with a small spread enters the optical diffusion sheet 12.

When the length d for maintaining the coherence is sufficiently greater than the particle diameters of the optical diffusion beads 52 (as when the length d for maintaining the coherence is 200 microns, and the particle diameter of the optical diffusion beads 52 is 20 microns), the light and dark spots, or the speckle, is observed in the wavefront of the image light transmitting through the optical diffusion sheet 12.

On the other hand, FIG. 7 shows an example in which the wavefront-dividing phase-modulating component 21 is disposed in front of the optical diffusion sheet 12.

Here, for the sake of simplicity of explanation, let us consider a case where the wavefront-dividing phase-modulating component 21 has a grating structure with a period p.

It is assumed that the period p is sufficiently greater than the wavelength λ, and is equal to or less than the particle diameters of the optical diffusion beads 52.

In this case, although the image light passing through the wavefront-dividing phase-modulating component 21 makes an optical path length difference through the grating structure, since the image light does not spread as described above, there is no effect of reducing the length d for maintaining the coherence. However, since the wavefront of the image light is spatially divided, the optical path lengths of the individual wavefronts after the division make difference, thereby changing the pattern of the light and dark spots.

Figure 8:
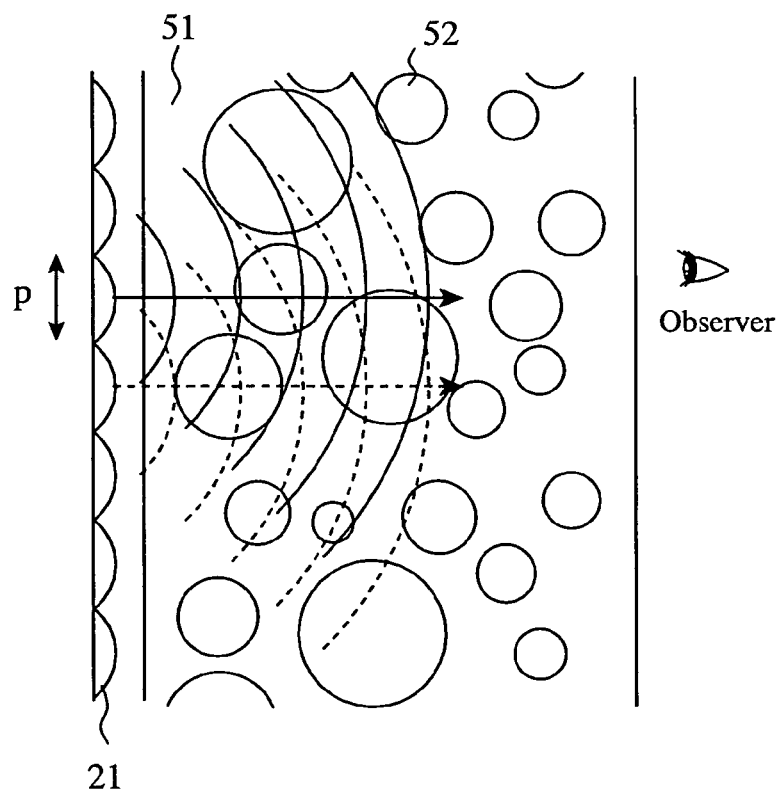
FIG. 8 is a diagram illustrating an interior of the optical diffusion sheet 12.
Figure 9:
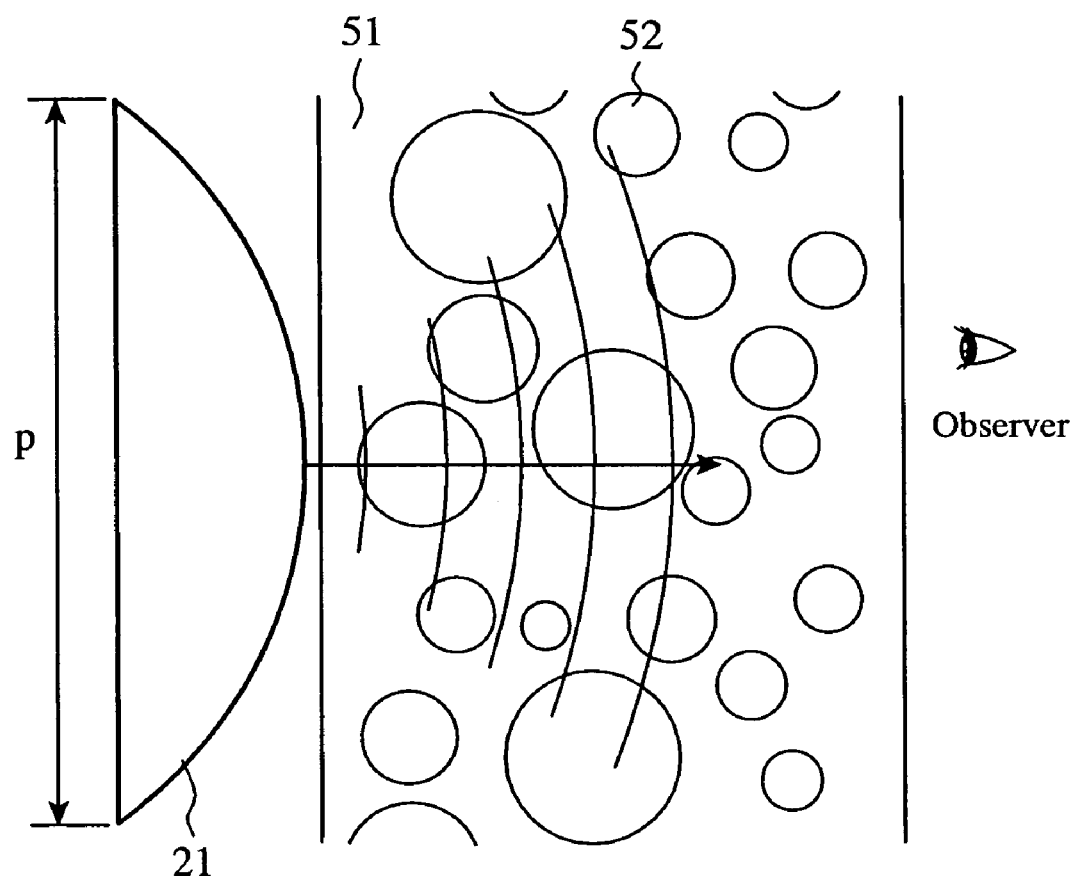
FIG. 9 is a diagram illustrating an interior of the optical diffusion sheet 12.

Although FIG. 7 shows an example in which the surface of the wavefront-dividing phase-modulating component 21 has a shape composed of planes connected to each other, FIG. 8 and FIG. 9 show examples in which the surface of the wavefront-dividing phase-modulating component 21 has a shape composed of curved surfaces connected.

The wavefront of the image light is spatially divided according to the length of the wavefront-dividing phase-modulating component 21, and the divided wavefronts are provided with inclinations and phase differences.

In this case, as is clear from the foregoing discussion, there is an advantage of reducing the length d for maintaining the coherence.

In addition, since the wavefront of the image light is divided into the wavefronts with length p, the light and dark spots pattern changes.

When the wavefront-dividing phase-modulating component 21 has a curved surface (see FIG. 8), the wavefronts are provided with inclinations, which differs from the case where the wavefront-dividing phase-modulating component 21 has a plane surface. Thus, the divided wavefronts are superposed on each other.

In other words, the wavefronts are not only provided with the inclinations or phase differences, but also subjected to equalization through the cancellation of their peaks and valleys by the averaging due to the superposition of the variety of wavefronts because they are divided into fine pieces spatially.

On the other hand, when the wavefront-dividing phase-modulating component 21 has a length comparatively greater than the fluctuation structure (the placement of the optical diffusion beads 52 with different refractive indices in the optical diffusion sheet medium 51) (see FIG. 9), it can spread the image light entering the optical diffusing component 10 (it can provide a variety of inclinations to the wavefronts incident to the optical diffusing component 10). Accordingly, although it has an advantage of being able to reduce the length d for maintaining the coherence, it does not have an advantage of averaging through the superposition of a variety of wavefronts.

As described above, the speckle can be reduced by interpolating the wavefront-dividing phase-modulating component 21 between the Fresnel lens screen 7 and the optical diffusing component 10. In practice, however, since the screen is composed of a plurality of optical components, consideration must be taken not to degrade the functions of the individual optical components.

The transparent screen 6 includes at least the Fresnel lens screen 7 and the optical diffusing component 10. The Fresnel lens screen 7 is selected in accordance with the characteristics of the projector 1. On the other hand, the optical diffusing component 10 is selected in accordance with the optical characteristics such as the angle of visibility or the luminance of the screen. Accordingly, they are designed and produced separately, and are selected independently of each other. Thus, the Fresnel lens screen 7 and optical diffusing component 10 can be considered separately.

Here, let us consider the case where the light-input side Fresnel lens as shown in FIG. 1 is used as the Fresnel lens 9 of the Fresnel lens screen 7.

In this case, the Fresnel lens 9 is one of a light-input side total reflection/refraction mixing type Fresnel lens 61 (a Fresnel lens having a total reflection prism and a refraction prism formed in a single pitch, in which the total reflection prism has a refracting surface for refracting the image light and a reflecting surface for reflecting the image light refracted by the refracting surface, and the refraction prism has a refracting surface for refracting the image light); a light-input side total reflection type Fresnel lens 62 (a Fresnel lens having a refracting surface for refracting the image light, and a reflecting surface for reflecting the image light refracted by the refracting surface); and a light-input side partial total reflection type Fresnel lens 63 (a Fresnel lens having a non-incidence plane which is formed approximately in parallel with the Fresnel lens substrate 8, and on which the image light is not irradiated directly because the image light is intercepted by the Fresnel prism in front of the non-incidence plane).

Figure 10:
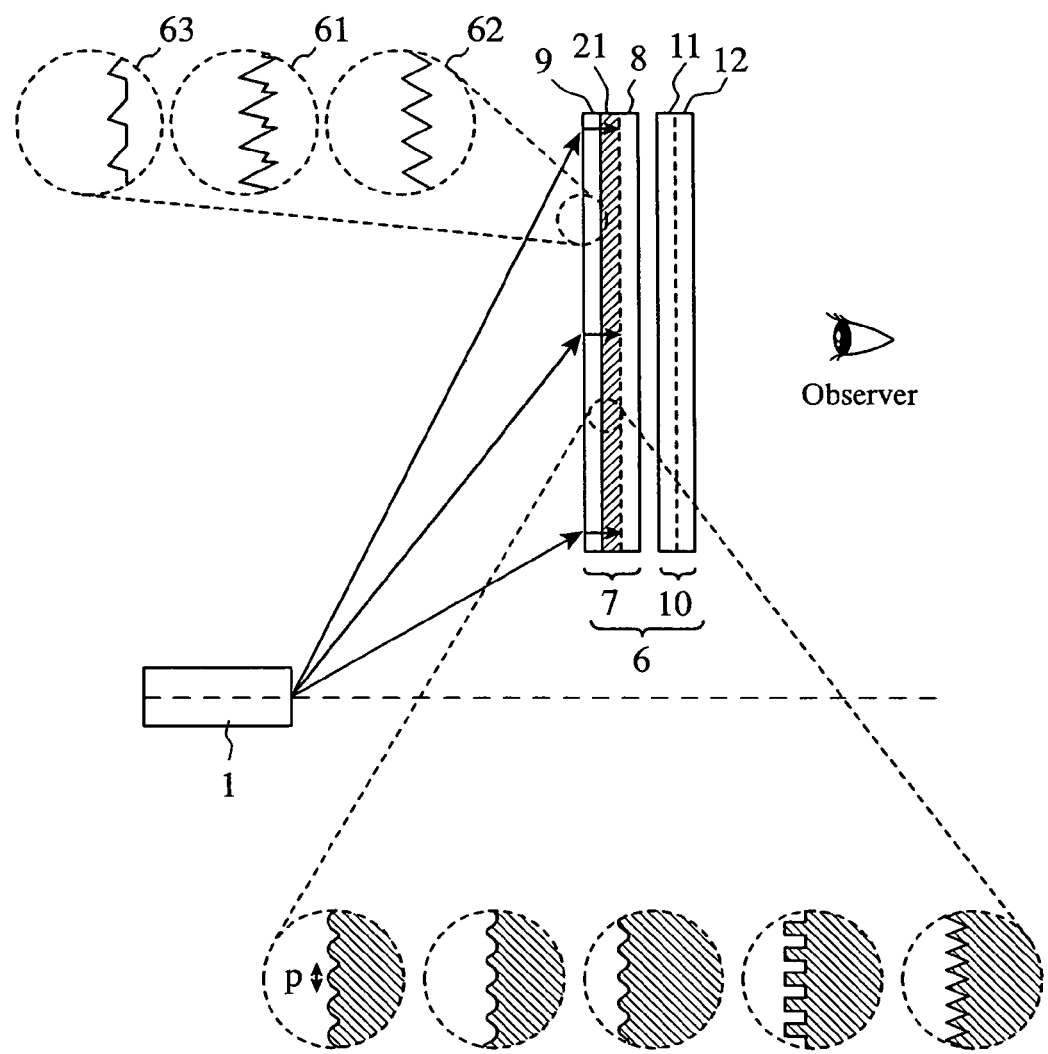
FIG. 10 is a diagram showing another configuration of the projection display unit of the embodiment 1 in accordance with the present invention.

Although the wavefront-dividing phase-modulating component 21 is disposed on the light-output side of the Fresnel lens substrate 8 in the example of FIG. 1, the wavefront-dividing phase-modulating component 21 can be interposed between the Fresnel lens 9 and the Fresnel lens substrate 8 as shown in FIG. 10.

Figure 11:
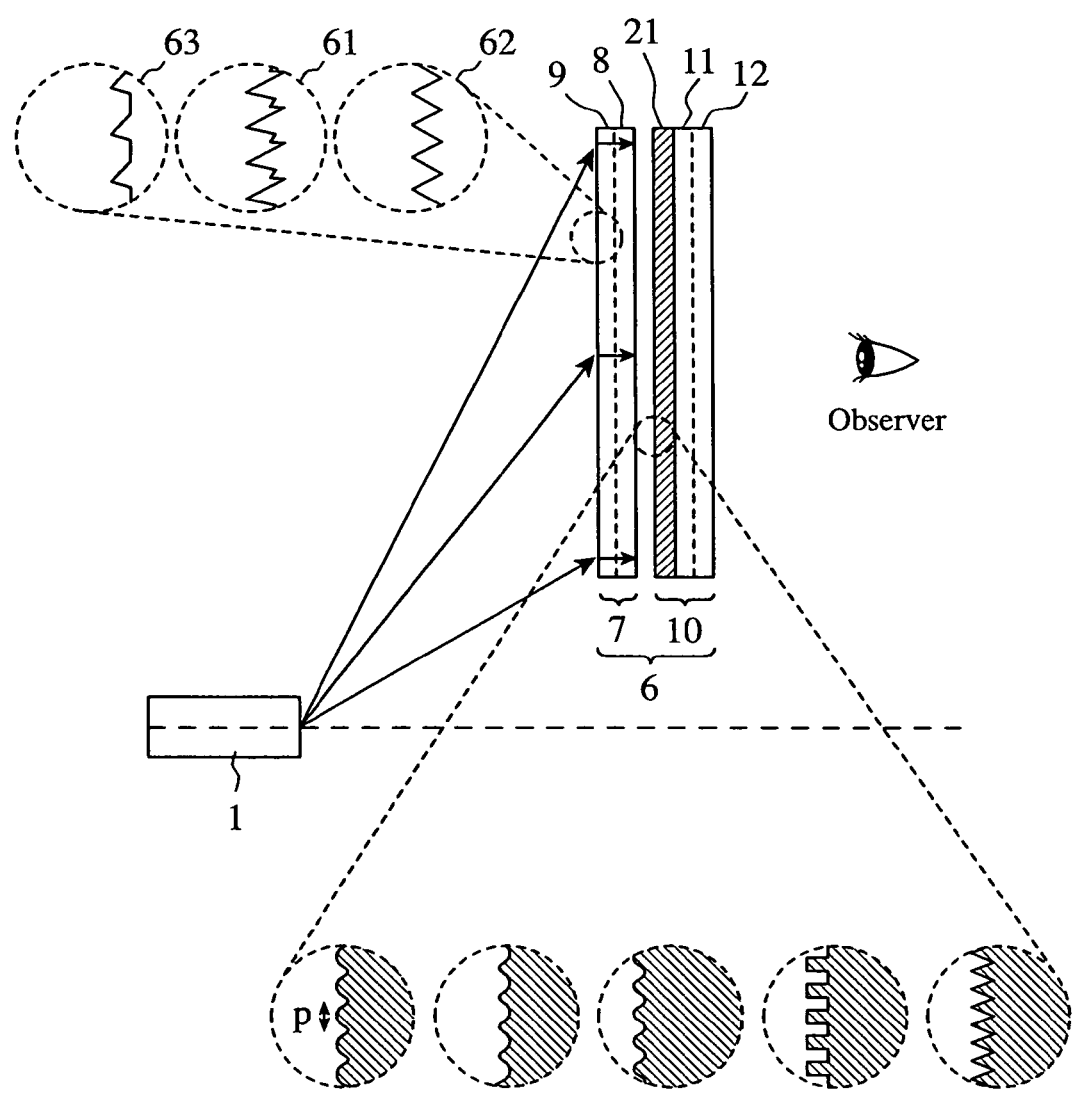
FIG. 11 is a diagram showing still another configuration of the projection display unit of the embodiment 1 in accordance with the present invention.

Alternatively, as shown in FIG. 11, the wavefront-dividing phase modulating component 21 can be disposed on the light-input side of the optical diffusing component 10.

The image light changes its traveling direction in proportion to the refractive index difference at the boundary surface. Thus, the transparent screen 6 of FIG. 1 utilizes the boundary surface with the air, and the transparent screen 6 of FIG. 10 utilizes the boundary surface with the Fresnel lens 9 of the Fresnel lens screen 7, which makes difference between the transparent screen 6 of FIG. 1 and that of FIG. 10.

The transparent screen 6 of FIG. 1 can be implemented by sticking the wavefront-dividing phase-modulating component 21 formed on a thin transparent substrate on the Fresnel lens substrate 8, for example. The transparent screen 6 of FIG. 1, the boundary surface of which is the air, has a characteristic that the light inclines greatly because of the refractive index difference between the air and the medium.

Figure 12:
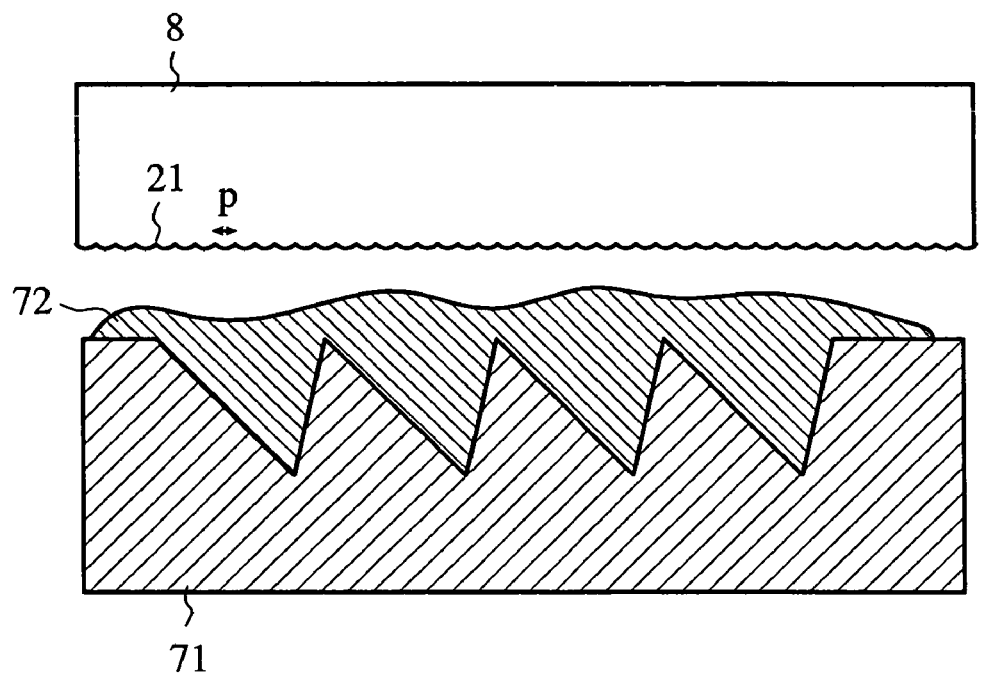
FIG. 12 is a diagram illustrating a fabrication method of the transparent screen 6 of FIG. 10.
Figure 13:
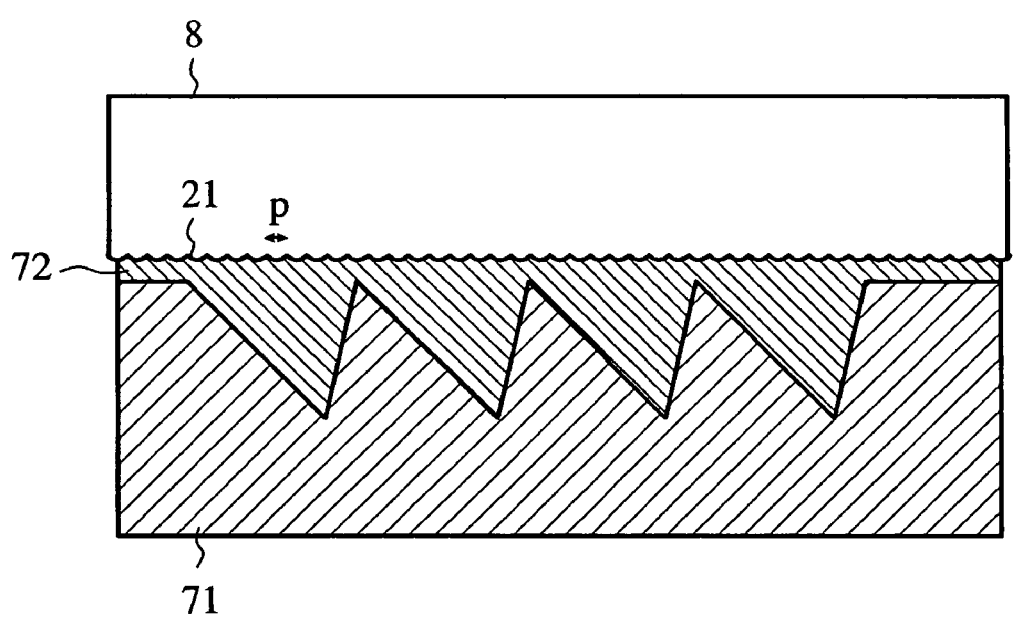
FIG. 13 is a diagram illustrating the fabrication method of the transparent screen 6 of FIG. 10.
Figure 14:
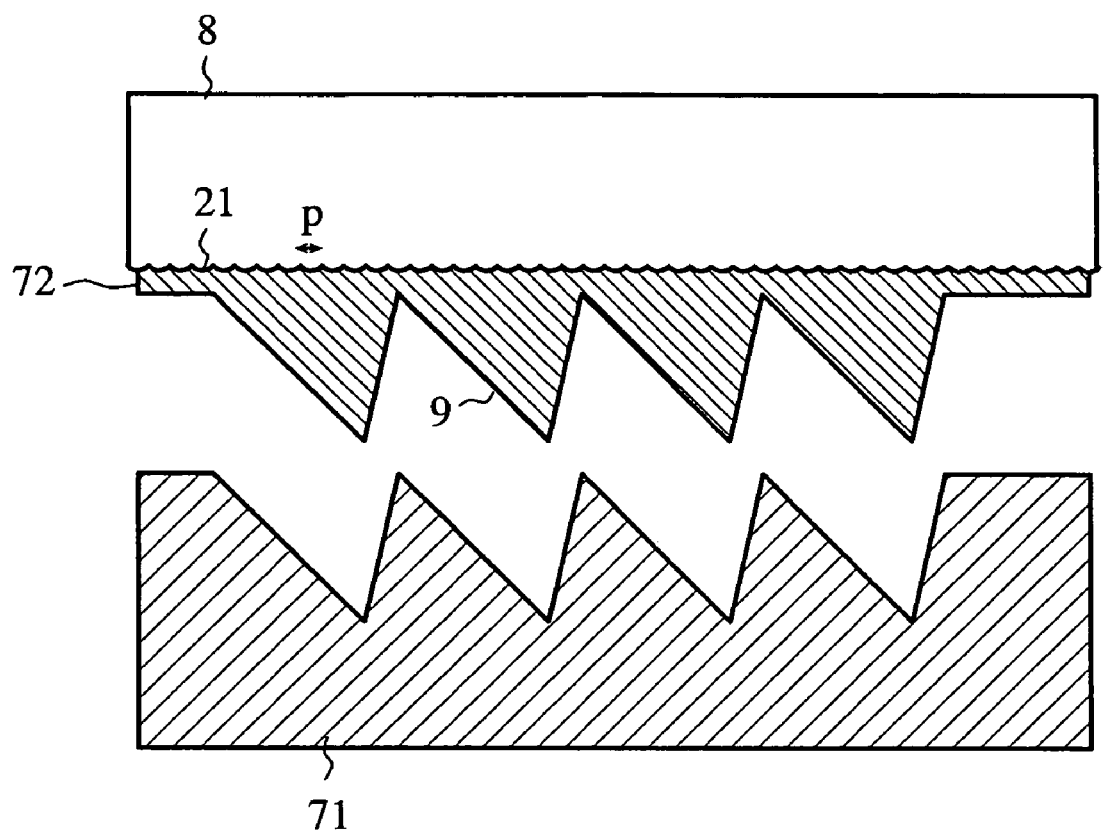
FIG. 14 is a diagram illustrating the fabrication method of the transparent screen 6 of FIG. 10.

The transparent screen 6 of FIG. 10 can be fabricated by a method as illustrated from FIG. 12 to FIG. 14.

For example, the wavefront-dividing phase-modulating component 21 is formed on the Fresnel lens substrate 8 (see FIG. 12).

On the other hand, as for the Fresnel lens 9, a photopolymerizable resin 72 is poured into a mold 71 having a lens shape carved therein (see FIG. 12), and the photosetting is carried out with pressing the Fresnel lens substrate 8 against them (see FIG. 13).

After that, the photopolymerizable resin 72 is separated from the mold 71 to form the Fresnel lens 9 on the light-input side of the Fresnel lens screen 7 (see FIG. 14).

As for the transparent screen 6 of FIG. 13, the refractive index difference between the Fresnel lens 9 and the wavefront-dividing phase-modulating component 21 is expected to be smaller than when the interface with the air is utilized because they both are a medium. In other words, it is difficult to provide the wavefront of the image light with a large inclination or phase difference.

When the propagation distance t0 of the image light is short, the diverging angle θ v of the image light must be increased as described above, and almost all the propagation distance t0 of the image light is given by the Fresnel lens substrate 8 of the Fresnel lens screen 7.

However, when the wavefront-dividing phase-modulating component 21 is provided before the Fresnel lens substrate 8 as in the transparent screen 6 of FIG. 10, the wavefront-dividing phase-modulating component 21 can also impart the propagation distance t0. This offers an advantage of obviating the need for increasing the diverging angle θ v of the image light.

As described above, the present embodiment 1 is configured in such a manner that the wavefront of the image light emitted from the Fresnel lens screen 7 is divided, and the wavefront-dividing phase-modulating component 21 for modulating the phases of the wavefronts is disposed before the optical diffusing component 10. Therefore the present embodiment 1 offers an advantage of being able to reduce the speckle with maintaining the brightness of the image light.

Embodiment 2

Figure 15:
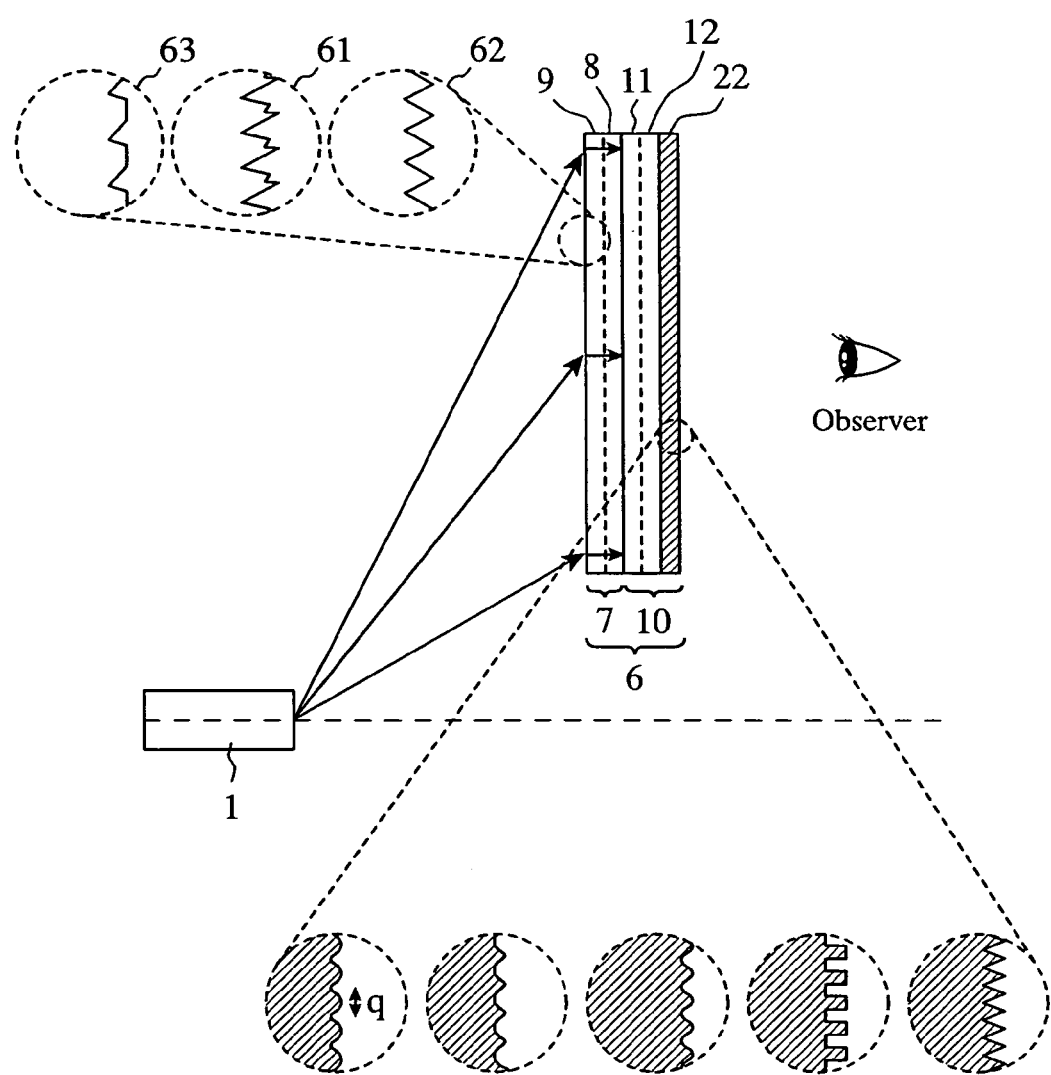
FIG. 15 is a diagram showing a configuration of a projection display unit of an embodiment 2 in accordance with the present invention.

Although the foregoing embodiment 1 is described by way of example which divides the wavefront of the image light, and disposes the wavefront-dividing phase-modulating component 21 for modulating the phases of the wavefronts before the optical diffusing component 10, this is not essential. For example, such a configuration as shown in FIG. 15 is also possible. It includes a spatial frequency modulating component 22 which is disposed on the light-output side (observer side) of the optical diffusing component 10, and which modulates the spatial frequency of the image light scattered through the optical diffusing component 10.

Incidentally, like the surface of the wavefront-dividing phase-modulating component 21, the surface of the spatial frequency modulating component 22 can be a curved surface shaped like a convex lens array, concave lens array or sinusoidal wave, or a plane shaped like a lattice or saw.

Here, the example of FIG. 15 employs a light-input side Fresnel lens as the Fresnel lens 9 of the Fresnel lens screen 7.

For example, it employs one of the light-input side total reflection/refraction mixing type Fresnel lens 61, light-input side total reflection type Fresnel lens 62, and light-input side partial total reflection type Fresnel lens 63.

Figure 16:
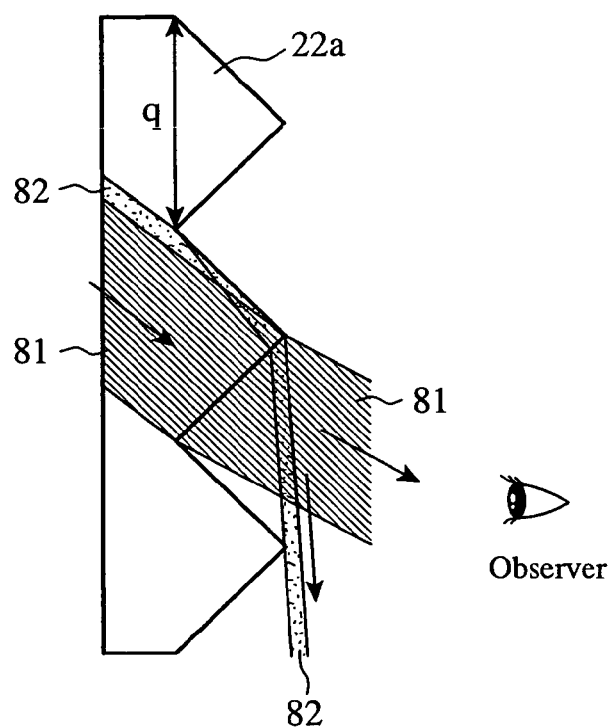

In addition, the example of FIG. 15 employs a sawlike prism 22a as shown in FIG. 16 as the spatial frequency modulating component 22.

When the sawlike prism 22a is employed as the spatial frequency modulating component 22, although being dependent on the vertex or refractive index of the sawlike prism 22a, an obliquely incident first ray bundle 81 is bent in the direction of an observer because of the refraction through the boundary surface of the sawlike prism 22a.

A part of the ray bundle (second ray bundle 82) carries out total reflection inwardly at the boundary surface of the sawlike prism 22a, and is sharply bent in an oblique direction by refraction through the opposite boundary surface.

Figure 17:
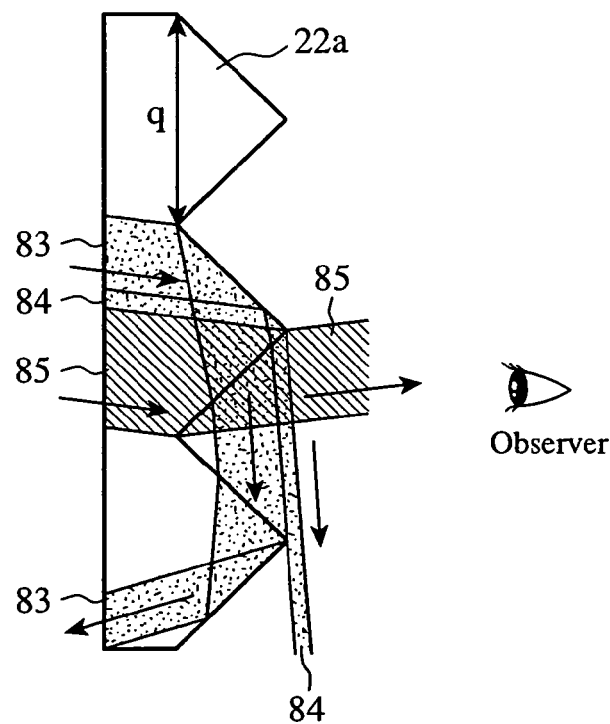

As illustrated in FIG. 17, when the ray bundle enters approximately in the direction of the observer, although a fifth ray bundle 85 is bent in the direction of the observer, a third ray bundle 83 and fourth ray bundle 84 carry out the total reflection inwardly at the boundary surface of the sawlike prism 22a.

After that, the fourth ray bundle 84 is bent greatly in the oblique direction because of the refraction through the opposite boundary surface. On the other hand, the third ray bundle 83 is bent greatly through the adjacent sawlike prism 22a, and heads back the way it has come (opposite side of the observer).

Here, let us pay attention to the third ray bundle 83. The third ray bundle 83 enters the optical diffusing component 10 again because of the total reflection occurring inwardly through the boundary surface of the sawlike prism 22a.

Assume that the third ray bundle 83, which enters the optical diffusing component 10 again, is scattered through the optical diffusing component 10, and is bent in the direction of the observer just as the fifth ray bundle 85, for example.

Since the third ray bundle 83 has passed through at least one sawlike prism 22a, its image becomes blurred by an amount of one sawlike prism 22a. Accordingly, appropriately reducing the unit length q of the sawlike prism 22a (making at least sufficiently smaller than the projected pixel) enables the sawlike prism 22a to operate as a low-pass filter, thereby offering an advantage of being able to reduce the high frequency component of the spatial frequency.

Figure 18:
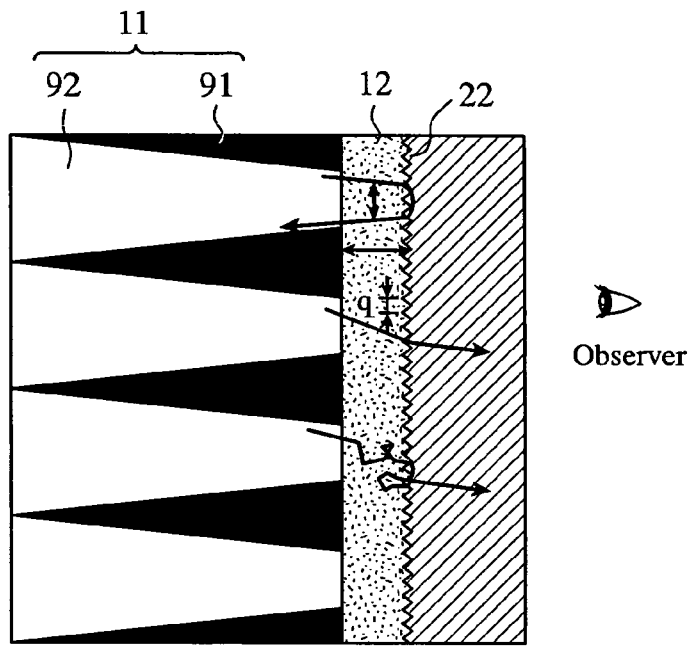
FIG. 18 is a diagram illustrating image light propagating through the spatial frequency modulating component 22.

FIG. 18 is a diagram illustrating the image light propagating through the spatial frequency modulating component 22.

As for the image light passing through the lens element 11 (optical absorption sections 91 and unit lenses 92) and entering the optical diffusion sheet 12, a part thereof heads back the way it has come, and another part is emitted to the observer through the spatial frequency modulating component 22.

In this case, the image light emitted toward the observer propagates through several spatial frequency modulating components 22 with the length q.

To prevent the adverse effect of blurring the image during the propagation of the image light through the optical diffusion sheet 12, it is necessary for the optical diffusion sheet 12 to have a thickness of several times the length q.

More specifically, the size of the projection pixels is about 1 mm, the period of the lens element 11 is about 50-100 microns, the thickness of the optical diffusion sheet 12 is about 20-40 microns, and the length q of the spatial frequency modulating component 22 is about 5-20 microns. All of them are sufficiently greater than the wavelength $\lambda$ (0.3-0.7 microns).

The speckle noise, which is perceived in the form of innumerable light and dark spots (glare) at random, is recognized as very fine spots although depending on the fluctuations of the radiated surface.

The light and dark spots with a high spatial frequency can be equalized by disposing the spatial frequency modulating component 22 on the observer side of the optical diffusing component 10 as in the present embodiment 2.

For example, when a design is made in such a manner as to allow the image light to propagate through three sawlike prisms 22a of the spatial frequency modulating component 22, the image will not blur beyond that (four or more). This makes it possible to equalize only the speckle noise selectively without much affecting the low frequency components such as pixels.

Embodiment 3

Although the foregoing embodiments 1 and 2 are described by way of example of the transparent screen 6 including the wavefront-dividing phase-modulating component 21 or spatial frequency modulating component 22, the transparent screen 6 is rarely used singly, but is normally used in combination with the projector 1.

Figure 25:
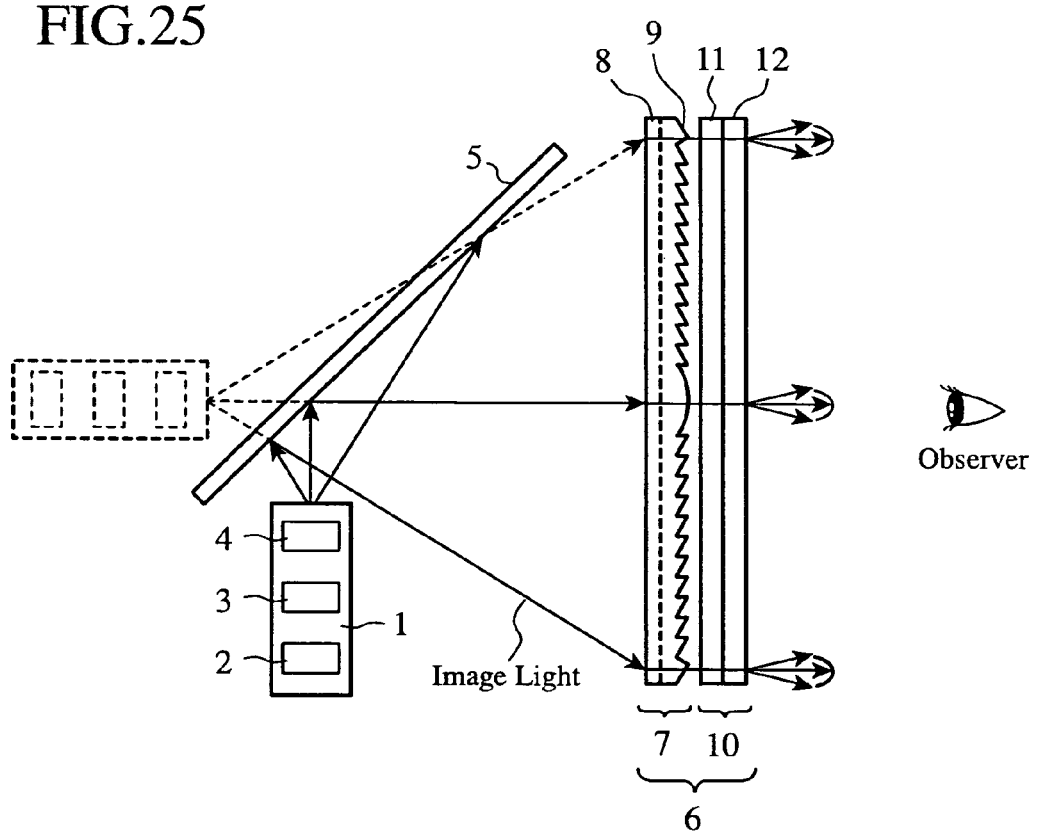
FIG. 25 is a diagram showing a configuration of a conventional projection display unit.

As shown in FIG. 25, the conventional rear projection display unit typified by the rear projector, which has the optical axis of the projection optical system 4 approximately coincident with the center of the transparent screen 6, bends the image light with the reflecting mirror 5 to reduce the depth or size of the projection display unit.

Figure 26:
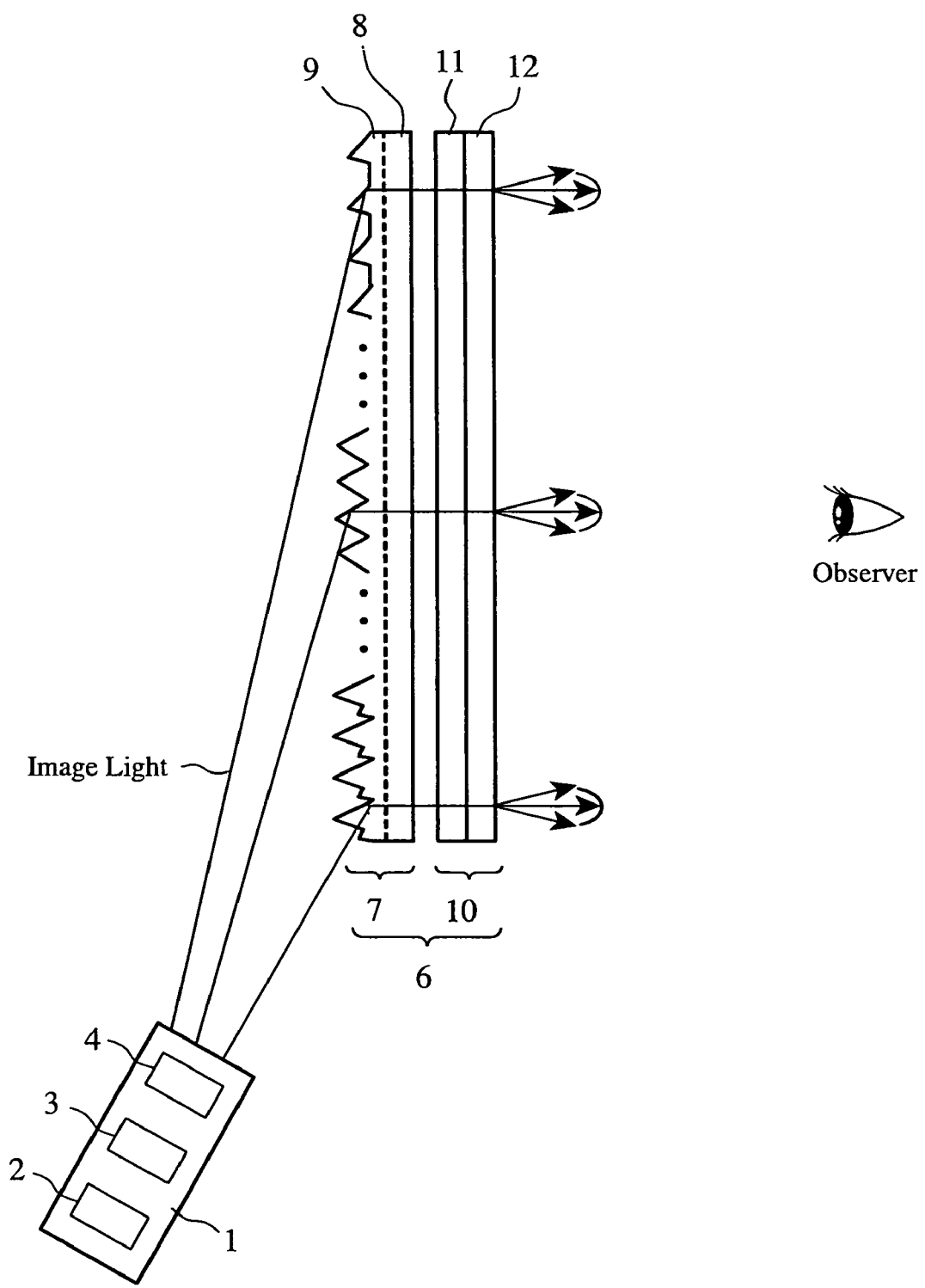
FIG. 26 is a diagram showing a configuration of a conventional projection display unit.

In addition, to achieve a further slimming down, there is a projection display unit as shown in FIG. 26 in which the projector 1 projects the image light obliquely onto the transparent screen 6 at a steep angle.

For example, consider the case where a laser light source with large coherence is used as the illuminating light source. Since the laser light source emits light from a small area with a small spread angle, it has an advantage of being able to miniaturize the illuminating optical system 2 and projection optical system 4.

It goes without saying that miniaturizing the illuminating optical system 2 which is one of the contents can facilitate reducing the thickness or size of the projection display unit in its entirety. Thus, the transparent screen 6 described above is suitable for a method of projecting light obliquely at a steep angle.

Figure 27:
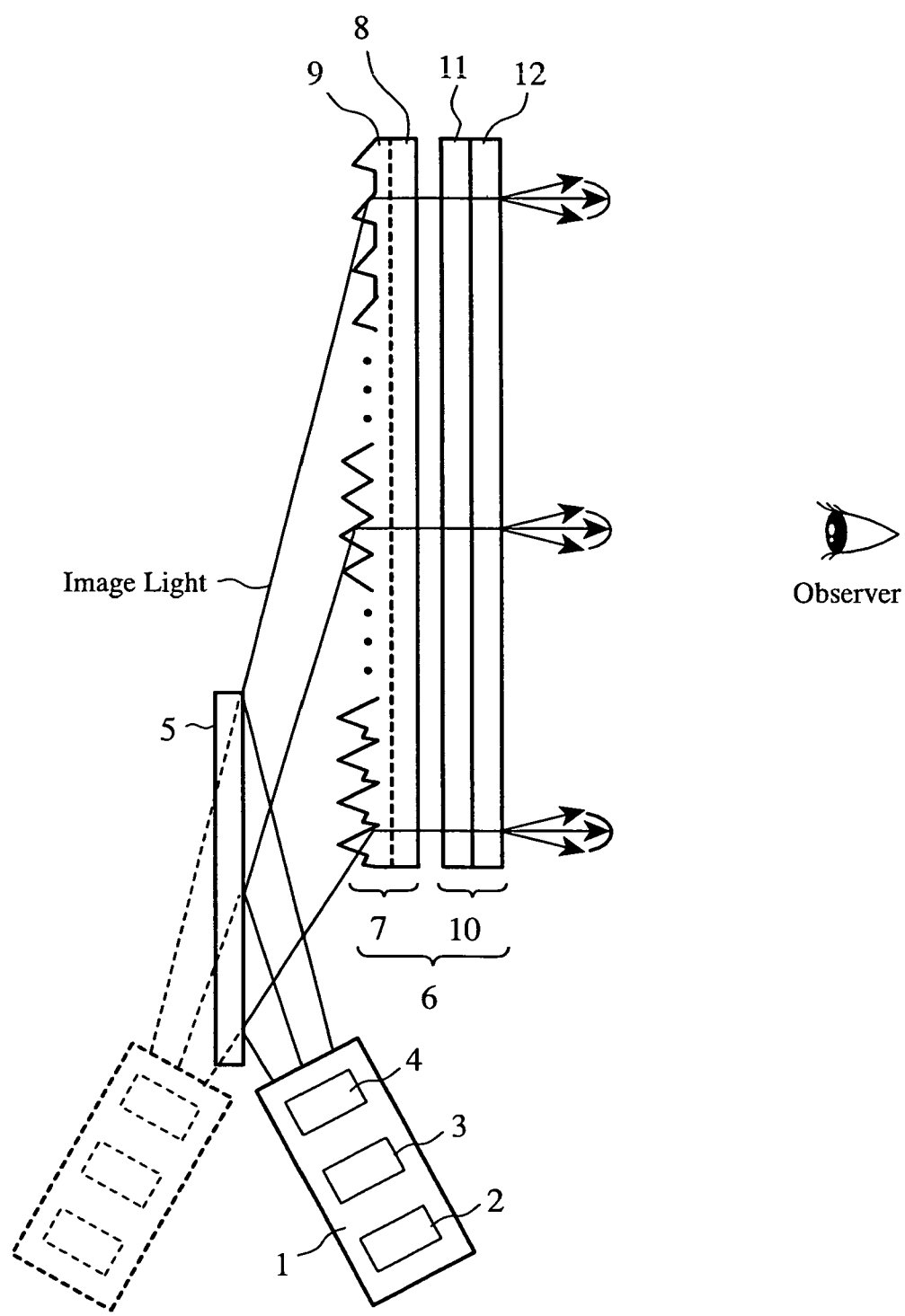
FIG. 27 is a diagram showing a configuration of a conventional projection display unit.
Figure 28:
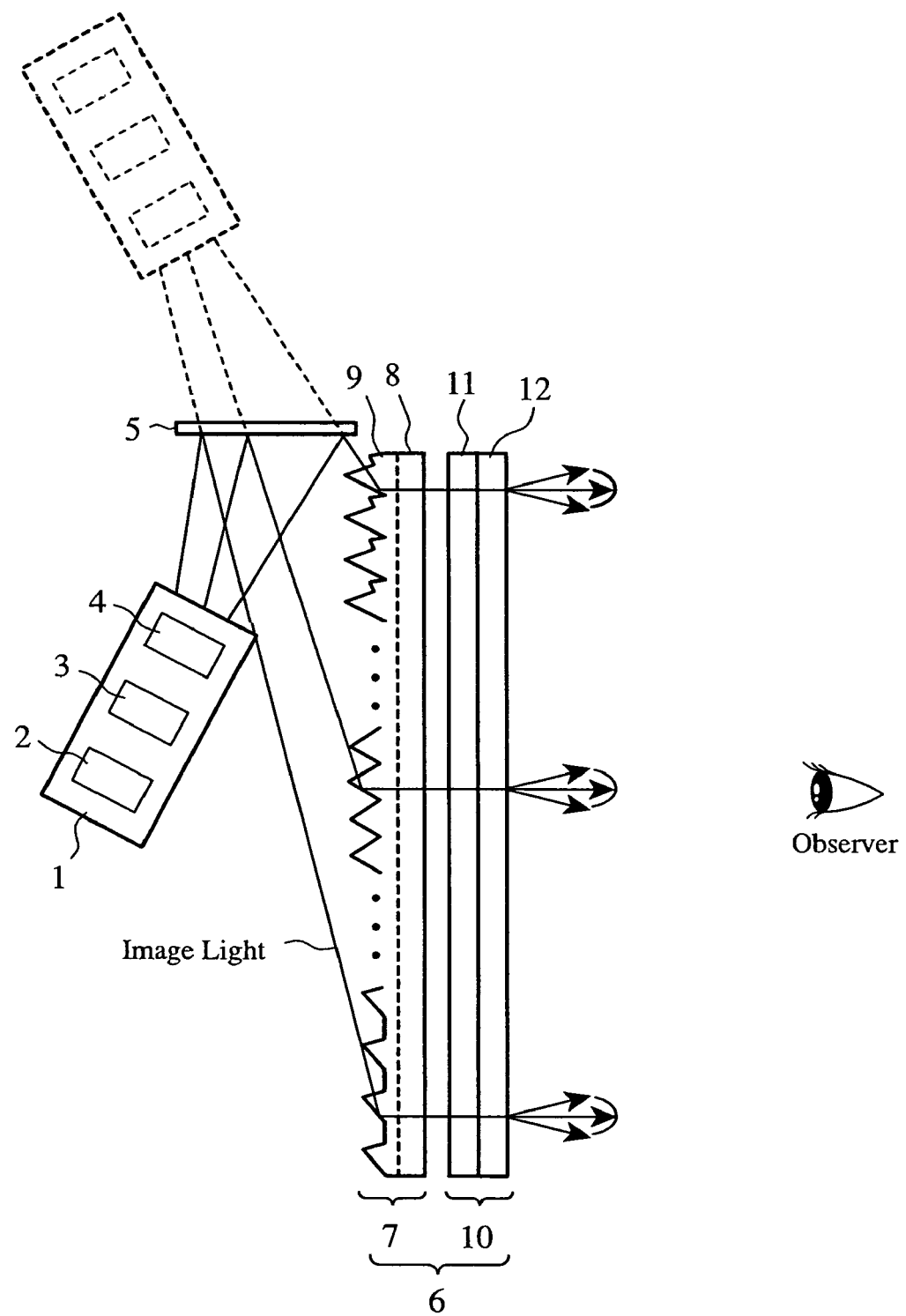
FIG. 28 is a diagram showing a configuration of a conventional projection display unit.

It goes without saying that the reduction in thickness and size can also be achieved by disposing a reflecting mirror 5 at some midpoint on the optical path in such a manner that the reflecting mirror 5 bends the image light as shown in FIG. 27 or FIG. 28. Incidentally, the top and the bottom of the transparent screen 6 are not limited to those of these figures, but can be reversed.

Although it seems that FIG. 26 differs from FIG. 25 only in that the projector 1 is placed obliquely, this is not true because simply sloping it will cause a rectangular object to be projected in the form of a trapezoid.

Figure 19:
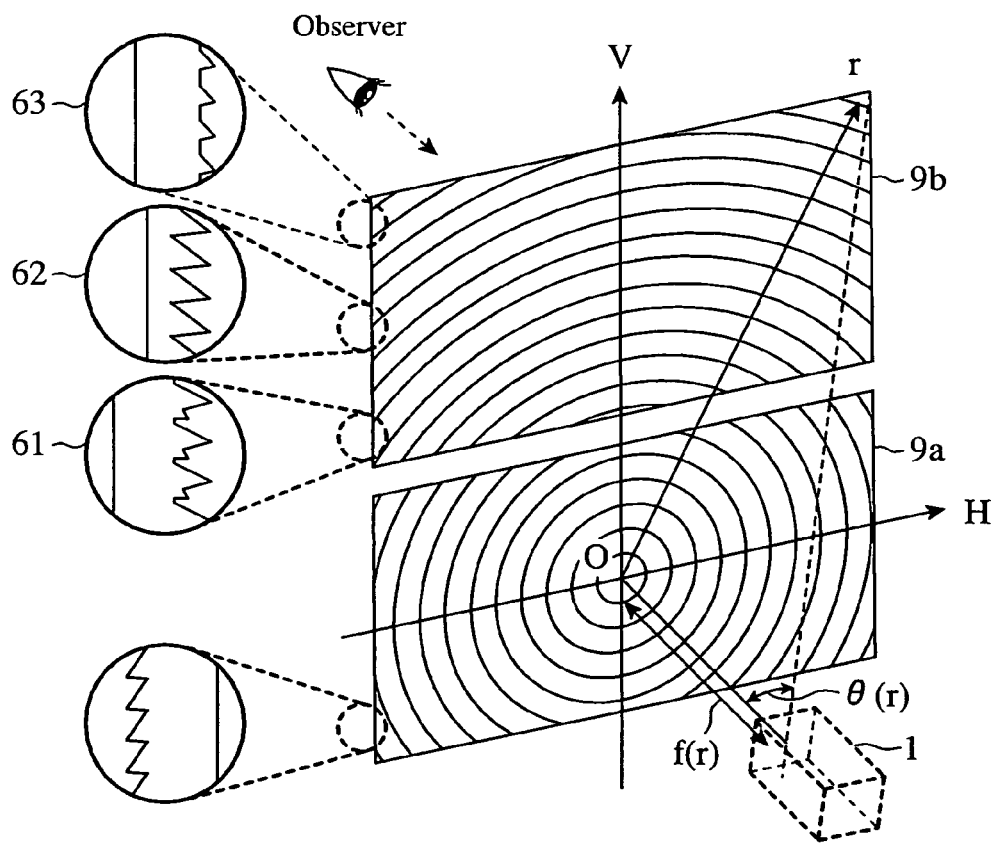
FIG. 19 is a schematic diagram illustrating relationships between the optical axis of the projection optical system 4 of the projector 1 and the Fresnel lens screen 7 of the transparent screen 6.

FIG. 19 is a diagram schematically illustrating relationships between the optical axis of the projection optical system 4 of the projector 1 and the Fresnel lens screen 7 of the transparent screen 6.

In the Fresnel lens 9 of the Fresnel lens screen 7, a light-output side Fresnel lens 9a having prisms on the light-output surface has its rotational center at the center of the screen, and the rotational center approximately agrees with the optical axis of the projection optical system 4.

On the other hand, a light-input side Fresnel lens 9b having prisms on the light-input side has its rotational center outside the screen, and the rotational center approximately agrees with the optical axis of the projection optical system 4.

Thus, the spread angle of the light-input side Fresnel lens 9b from the optical axis is θ, and the spread angle θ, which corresponds to the incident angle θ onto the Fresnel lens screen 7, is greater than the spread angle of the light-output side Fresnel lens 9a from the optical axis. In other words, as shown in FIG. 20, as for a ray bundle A and ray bundle B forming the same areas on the screen, it is found that the ray bundle B including the optical axis has a smaller incident angle θ, and the ray bundle A outside the optical axis has a larger incident angle θ.

Figure 20:
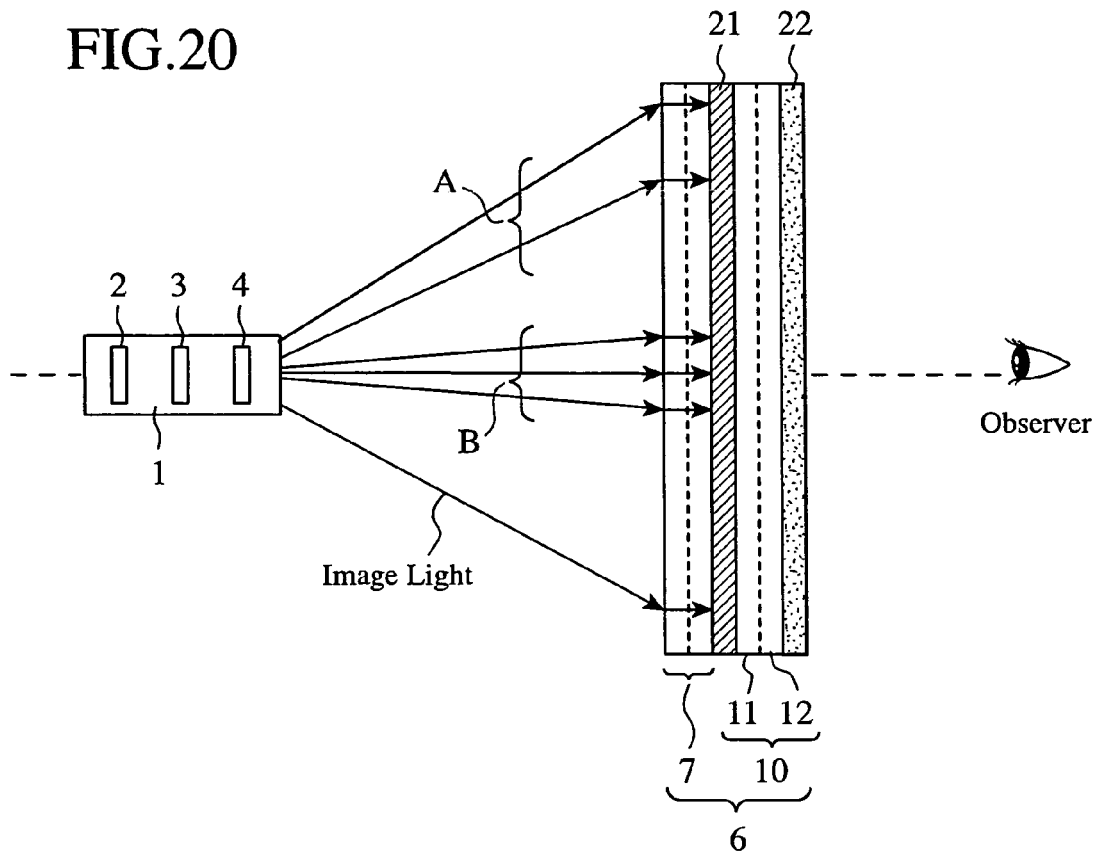
FIG. 20 is a diagram illustrating an incident angle θ of ray bundles A and B.

As clearly seen from FIG. 20, the Fresnel lens screen 7 is a collimating lens for deflecting the image light radiated from the projection optical system 4 to the optical diffusion sheet 12 which is the image plane and can be considered as a field lens.

To deflect extremely oblique projection light toward a normal of the screen, the traveling direction of the image light must be changed greatly. Achieving it utilizing only the refraction phenomenon of the image light will present a problem of a loss of energy because of the Fresnel reflection and a problem of color separation because of the dispersion phenomenon of light.

In such a case, the light-input side Fresnel lens 9b having the prisms formed on the light-input side is more suitable than the light-output side Fresnel lens 9a having the prisms formed on the light-output side as the conventional one. The light-input side Fresnel lens 9b includes the following Fresnel lenses, for example.

(1) A light-input side total reflection type Fresnel lens 62 that deflects the ray bundle entering the prisms toward the light-output surface direction by utilizing the total reflection on the opposite surface.

(2) A light-input side partial total reflection type Fresnel lens 63 that has its valleys formed in parallel with the light-output surface of the total reflection type Fresnel lens 62.

(3) A light-input side total reflection/refraction mixing type Fresnel lens 61 that has in each prism a combination of the total reflection type Fresnel lens 62 and a refraction type Fresnel lens for refracting the ray bundle entering the prism and for deflecting it toward the light-output surface.

It goes without saying that one of the Fresnel lenses 61-63 is to be selected in accordance with the design of the projector 1 rather than using the three types in one screen at the same time.

Figure 21:
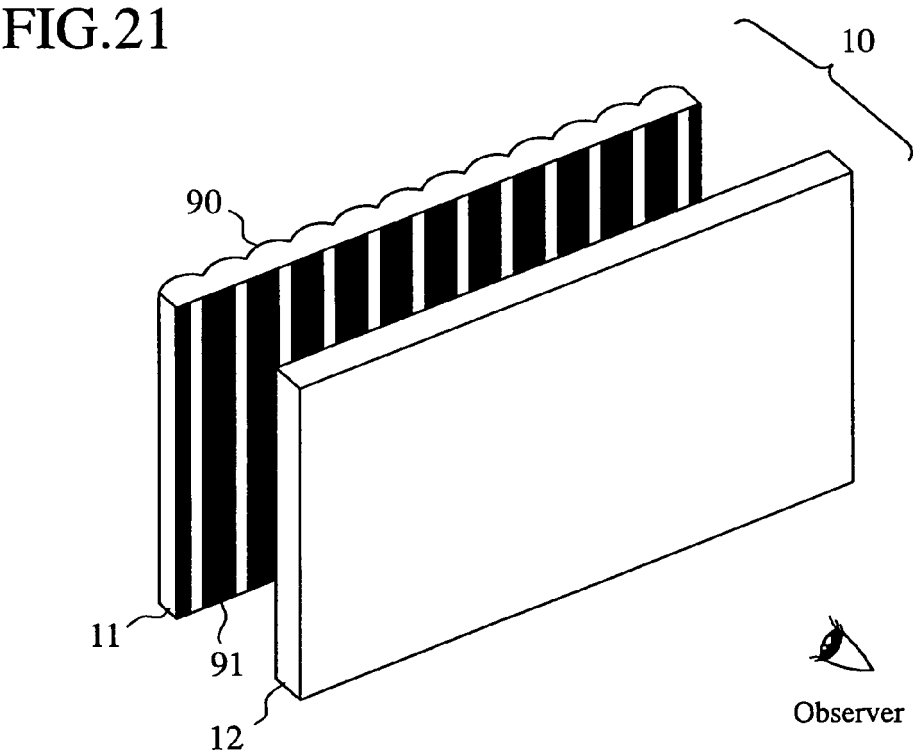
FIG. 21 is a perspective view showing a structure of an optical diffusing component 10.
Figure 22:
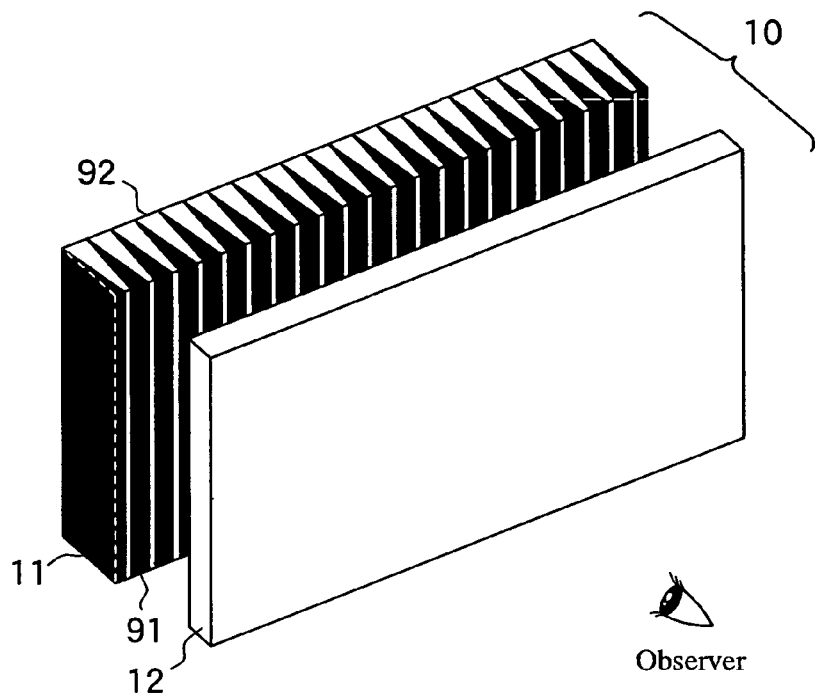
FIG. 22 is a perspective view showing a structure of the optical diffusing component 10.

As for the optical diffusing component 10, the following structures are possible. First, as shown in FIG. 21, it has cylindrical lenses 90 formed on the light-input side, and optical absorption sections 91 formed in stripes at positions corresponding to non-condensing sections of the cylindrical lens 90. Second, as shown in FIG. 22, instead of the cylindrical lenses 90 formed on the light-input side, it has trapezoidal unit lenses 92 for causing a part of the incident light to make total reflection on the total reflection section and then emitting the light from the light emitting section, and has the optical absorption sections 91 formed at the valleys of the unit lenses 92 in stripes.

Figure 23:
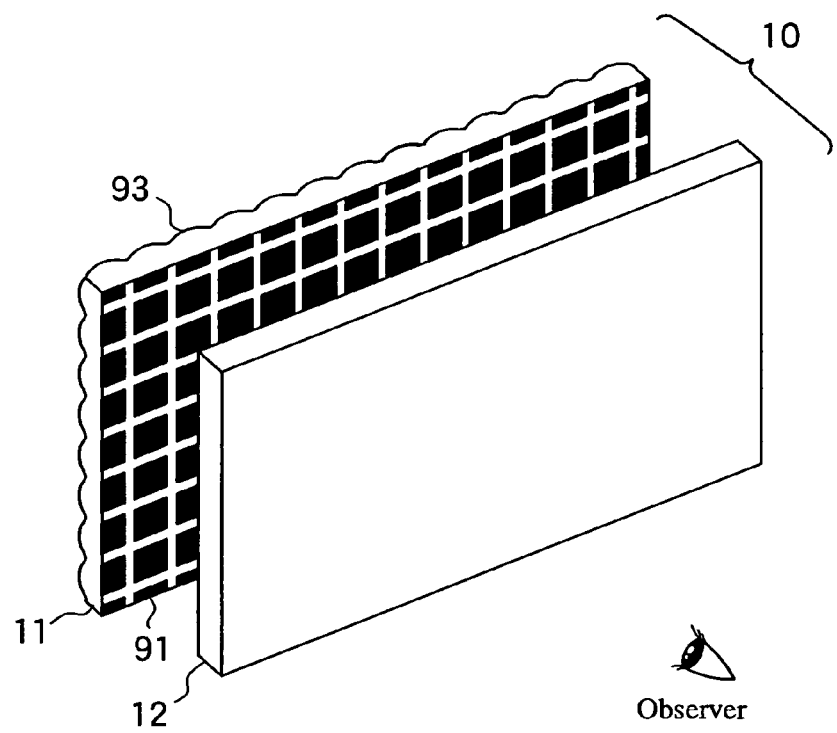
FIG. 23 is a perspective view showing a structure of the optical diffusing component 10.
Figure 24:
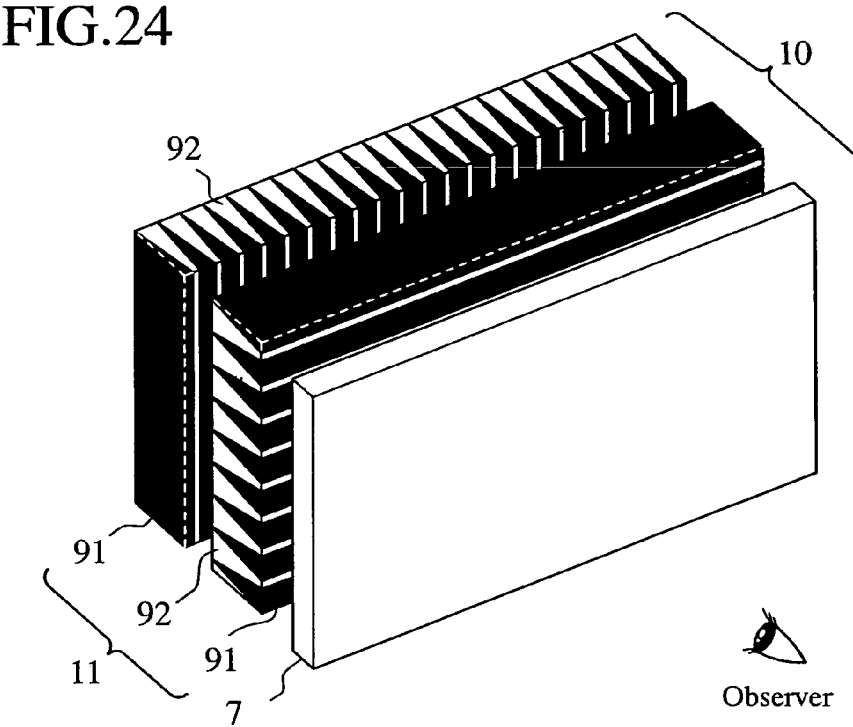
FIG. 24 is a perspective view showing a structure of the optical diffusing component 10.

Alternatively, combinations of them are also possible. First, as shown in FIG. 23, a structure is also possible that has cylindrical lenses 93 formed in the horizontal and vertical directions of the light-input side, and the optical absorption sections 91 formed in a grid pattern at positions of the non-condensing sections of the horizontal and vertical cylindrical lenses 93. Second, as shown in FIG. 24, a structure is also possible that has trapezoidal unit lenses 92 disposed orthogonally in the horizontal and vertical directions in front and behind, at the valleys of which the optical absorption section 91 are formed in a grid pattern. It goes without saying that the order of the horizontal and vertical directions is not limited to those examples.

To reduce the effect of external light, the optical diffusion sheet 12 of the optical diffusing component 10 can have an anti reflection layer (not shown) for reducing the reflection of light on the light-output surface.

In addition, it is also possible to provide an anti glare layer (not shown) for suppressing glare, an antistatic layer (not shown) for protecting from dust because of the static electricity, or a hard coating (not shown) for protecting the surface.

Although the embodiments 1-3 show the total reflection Fresnel lens and lenticular lens screen as independent components to make easier to understand, they can be stuck together into one element with adhesive layers, for example.

The projection display unit using the foregoing transparent screen 6 has at least the projector 1 which includes the light valve 3 for forming an image, the illuminating optical system 2 for illuminating the light valve, and the projection optical system 4 for projecting the image; the transparent screen 6; and the optical diffusing component 10. The projection display unit can further include a casing, supporting mechanism, air conditioning device, speaker, TV stand, remote control photodetector, electric circuit, geometric correction circuit, color correction circuit and the like, for example.

What is claimed is:

1. A transparent screen comprising:
   a Fresnel optical component for receiving image light radiated from a light-emitting component, and for emitting the image light in a prescribed direction;
   a wavefront-dividing phase-modulating component for dividing a wavefront of the image light emitted from said Fresnel optical component, and for modulating phases of wavefronts divided; and
   an optical diffusing component for diffusing the image light, the phases of the wavefronts of which are modulated by said wavefront-dividing phase-modulating component,
   wherein said wavefront-dividing phase-modulating component has curved surfaces or flat surfaces having a unit period equal to or less than particle diameters of optical diffusion beads constituting said optical diffusing component.

2. A transparent screen comprising:
   a Fresnel optical component for receiving image light radiated from a light-emitting component, and for emitting the image light in a prescribed direction;
   an optical diffusing component for diffusing the image light emitted from said Fresnel optical component; and
   a spatial frequency modulating component for modulating a spatial frequency of the image light diffused by said optical diffusing component,
   wherein said Fresnel optical component has prisms formed on an incidence plane side on which the image light radiated from the light-emitting component is incident.

3. The transparent screen according to claim 2, wherein a surface of said spatial frequency modulating component has a shape formed by connecting curved surfaces or a shape formed by connecting flat surfaces.

4. The transparent screen according to claim 3, wherein the curved surfaces or flat surfaces of said spatial frequency modulating component have a unit period equal to or less than the size of a unit pixel of the image light radiated from the light-emitting component.

5. The transparent screen according to claim 3, wherein the curved surfaces or flat surfaces of said spatial frequency modulating component have a unit period equal to or less than a period of lens elements constituting said optical diffusing component.

6. A transparent screen comprising:
a Fresnel optical component for receiving image light radiated from a light-emitting component, and for emitting the image light in a prescribed direction;
a wavefront-dividing phase-modulating component for dividing a wavefront of the image light emitted from said Fresnel optical component, and for modulating phases of wavefronts divided; and
an optical diffusing component for diffusing the image light, the phases of the wavefronts of which are modulated by said wavefront-dividing phase-modulating component,
wherein said Fresnel optical component has prisms formed on an incidence plane side on which the image light radiated from the light-emitting component is incident.

7. The transparent screen according to claim 6, wherein a surface of said wavefront-dividing phase-modulating component has a shape formed by connecting curved surfaces or a shape formed by connecting flat surfaces.

8. The transparent screen according to claim 7, wherein the curved surfaces or flat surfaces of said wavefront-dividing phase-modulating component have a unit period equal to or less than particle diameters of optical diffusion beads constituting said optical diffusing component.

9. A projection display unit comprising:
a light-emitting component for radiating image light;
a Fresnel optical component for receiving the image light radiated from the light-emitting component, and for emitting the image light in a prescribed direction;
a wavefront-dividing phase-modulating component for dividing a wavefront of the image light emitted from said Fresnel optical component, and for modulating phases of wavefronts divided; and
an optical diffusing component for diffusing the image light, the phases of the wavefronts of which are modulated by said wavefront-dividing phase-modulating components,
wherein said wavefront-dividing phase-modulating component has curved surfaces or flat surfaces having a unit period equal to or less than particle diameters of optical diffusion beads constituting said optical diffusing component.

10. The projection display unit according to claim 9, wherein the light-emitting component is a laser light source.

11. A projection display unit comprising:
a light-emitting component for radiating image light;
a Fresnel optical component for receiving the image light radiated from the light-emitting component, and for emitting the image light in a prescribed direction;
an optical diffusing component for diffusing the image light emitted from said Fresnel optical component; and
a spatial frequency modulating component for modulating a spatial frequency of the image light diffused by said optical diffusing components,
wherein said Fresnel optical component has prisms formed on an incidence plane side on which the image light radiated from the light-emitting component is incident.

12. The projection display unit according to claim 11, wherein the light-emitting component is a laser light source.

13. A projection display unit comprising:
a light-emitting component for radiating image light;
a Fresnel optical component for receiving the image light radiated from the light-emitting component, and for emitting the image light in a prescribed direction;
a wavefront-dividing phase-modulating component for dividing a wavefront of the image light emitted from said Fresnel optical component, and for modulating phases of wavefronts divided; and
an optical diffusing component for diffusing the image light, the phases of the wavefronts of which are modulated by said wavefront-dividing phase-modulating component,
wherein said Fresnel optical component has prisms formed on an incidence plane side on which the image light radiated from the light-emitting component is incident.

14. The projection display unit according to claim 13, wherein the light-emitting component is a laser light source.

15. An image display method employing a transparent screen, the method comprising:
receiving at a Fresnel optical component of the transparent screen, image light radiated from a light-emitting component, and for emitting the image light in a prescribed direction;
dividing a wavefront of the image light at a wavefront-dividing phase-modulating component from said Fresnel optical component, and for modulating phases of wavefronts divided; and
diffusing the image light at an optical diffusing component, the phases of the wavefronts of which are modulated by said wavefront-dividing phase-modulating component,
wherein said wavefront-dividing phase-modulating component has curved surfaces or flat surfaces having a unit period equal to or less than particle diameters of optical diffusion beads constituting said optical diffusing component.

16. An image display method employing a transparent screen, the method comprising:
receiving at a Fresnel optical component of the transparent screen, image light radiated from a light-emitting component, and for emitting the image light in a prescribed direction;
dividing a wavefront of the image light at a wavefront-dividing phase-modulating component from said Fresnel optical component, and for modulating phases of wavefronts divided; and
diffusing the image light at an optical diffusing component, the phases of the wavefronts of which are modulated by said wavefront-dividing phase-modulating component,
wherein said Fresnel optical component has prisms formed on an incidence plane side on which the image light radiated from the light-emitting component is incident.

17. An image display method employing a transparent screen, the method comprising:
receiving at a Fresnel optical component of the transparent screen, image light radiated from a light-emitting component, and for emitting the image light in a prescribed direction;
diffusing the image light at an optical diffusing component emitted from said Fresnel optical component; and
modulating a spatial frequency component for modulating a spatial frequency of the image light diffused by said optical diffusing component,
wherein said Fresnel optical component has prisms formed on an incidence plane side on which the image light radiated from the light-emitting component is incident.

* * * * *